United States Patent
Epstein

(10) Patent No.: US 9,120,016 B2
(45) Date of Patent: Sep. 1, 2015

(54) INTERACTIVE GUITAR GAME DESIGNED FOR LEARNING TO PLAY THE GUITAR

(75) Inventor: Joseph Charles Epstein, New York, NY (US)

(73) Assignee: Ubisoft Entertainment, Rennes (FR)

(*) Notice: Subject to any disclaimer, the term of this patent is extended or adjusted under 35 U.S.C. 154(b) by 378 days.

(21) Appl. No.: 12/623,368

(22) Filed: Nov. 20, 2009

(65) Prior Publication Data

US 2010/0137049 A1 Jun. 3, 2010

Related U.S. Application Data

(60) Provisional application No. 61/117,053, filed on Nov. 21, 2008.

(51) Int. Cl.
| | | |
|---|---|---|
| *A63F 13/10* | (2006.01) | |
| *A63F 13/40* | (2014.01) | |
| *A63F 13/20* | (2014.01) | |
| *G09B 15/00* | (2006.01) | |
| *G10H 1/00* | (2006.01) | |
| *G10H 1/36* | (2006.01) | |

(52) U.S. Cl.
CPC ............... *A63F 13/10* (2013.01); *A63F 13/06* (2013.01); *G09B 15/00* (2013.01); *G10H 1/0016* (2013.01); *G10H 1/368* (2013.01); *A63F 2300/1062* (2013.01); *A63F 2300/305* (2013.01); *A63F 2300/638* (2013.01); *A63F 2300/8047* (2013.01); *G10H 2210/066* (2013.01); *G10H 2210/091* (2013.01); *G10H 2220/015* (2013.01); *G10H 2220/145* (2013.01)

(58) Field of Classification Search
USPC ......... 84/477 R, 741, 724; 434/350; 257/103; 345/773
See application file for complete search history.

(56) References Cited

U.S. PATENT DOCUMENTS

| | | | |
|---|---|---|---|
| 4,264,845 A | | 4/1981 | Bednarz |
| 4,318,327 A | * | 3/1982 | Toups .......................... 84/477 R |
| 4,919,030 A | | 4/1990 | Perron, III |
| 5,036,742 A | | 8/1991 | Youakim |
| 5,214,231 A | | 5/1993 | Ernst et al. |

(Continued)

FOREIGN PATENT DOCUMENTS

| | | |
|---|---|---|
| EP | 1465150 A | 10/2004 |
| WO | 9858364 A | 12/1998 |

(Continued)

OTHER PUBLICATIONS

International Search report dated Jul. 8, 2010 for PCT application PCT/US2009/065413.

(Continued)

*Primary Examiner* — Tramar Harper
(74) *Attorney, Agent, or Firm* — Erise IP, P.A.

(57) ABSTRACT

An interactive game designed for learning to play a guitar. A guitar may be connected to a computer or other platform, capable of loading music and displaying notes and chords and other feedback and visual learning aids on a display screen, allowing a user to read music and play along. The goal of the software or interactive game engine is for players to learn how to play a guitar. Users may operate the game in a number of modes with different goals, playing mini-games throughout the levels of the game. The game provides feedback and statistics to help users learn how to play the guitar.

37 Claims, 22 Drawing Sheets

(56) References Cited

U.S. PATENT DOCUMENTS

| | | |
|---|---|---|
| 5,270,475 A | 12/1993 | Weiss et al. |
| 5,408,911 A * | 4/1995 | Weiss et al. ............... 84/297 S |
| 5,533,903 A | 7/1996 | Kennedy |
| 5,583,308 A | 12/1996 | Owen |
| 5,585,583 A | 12/1996 | Owen |
| 5,627,335 A | 5/1997 | Rigopulos et al. |
| 5,690,496 A * | 11/1997 | Kennedy ................... 434/307 R |
| 5,763,804 A | 6/1998 | Rigopulos et al. |
| D398,595 S * | 9/1998 | Baer et al. .................... D14/486 |
| 5,834,671 A | 11/1998 | Phoenix |
| 5,990,405 A | 11/1999 | Auten et al. |
| 6,011,212 A | 1/2000 | Rigopulos et al. |
| 6,018,121 A | 1/2000 | Devecka |
| 6,066,791 A | 5/2000 | Renard et al. |
| 6,156,965 A | 12/2000 | Shinsky |
| 6,211,451 B1 | 4/2001 | Tohgi et al. |
| 6,225,547 B1 | 5/2001 | Toyama et al. |
| 6,268,557 B1 | 7/2001 | Devecka et al. |
| 6,336,092 B1 | 1/2002 | Gibson et al. |
| 6,347,998 B1 | 2/2002 | Yoshitomi et al. |
| 6,353,169 B1 | 3/2002 | Juszkiewicz et al. |
| 6,353,174 B1 | 3/2002 | Schmidt et al. |
| 6,369,313 B2 | 4/2002 | Devecka |
| 6,390,923 B1 | 5/2002 | Yoshitomi et al. |
| 6,410,835 B2 | 6/2002 | Suzuki et al. |
| 6,425,822 B1 | 7/2002 | Hayashida et al. |
| 6,425,827 B1 | 7/2002 | Nimura |
| 6,429,863 B1 | 8/2002 | LoPiccolo et al. |
| 6,476,304 B2 | 11/2002 | Uehara |
| 6,482,087 B1 | 11/2002 | Egozy et al. |
| 6,486,388 B2 | 11/2002 | Akahori |
| 6,495,747 B2 | 12/2002 | Shimaya et al. |
| 6,515,211 B2 | 2/2003 | Umezawa et al. |
| 6,541,692 B2 | 4/2003 | Miller |
| 6,605,769 B1 | 8/2003 | Juszkiewicz |
| 6,628,313 B1 * | 9/2003 | Minakuchi et al. ........... 715/853 |
| 6,645,067 B1 | 11/2003 | Okita et al. |
| 6,686,531 B1 | 2/2004 | Pennock et al. |
| 6,740,803 B2 | 5/2004 | Brinkman et al. |
| 6,751,439 B2 | 6/2004 | Tice et al. |
| 6,835,887 B2 | 12/2004 | Devecka |
| 6,850,252 B1 | 2/2005 | Hoffberg |
| 6,870,085 B2 | 3/2005 | MacCutcheon |
| 6,969,797 B2 | 11/2005 | Brinkman et al. |
| 6,974,325 B2 | 12/2005 | D Zmura |
| 7,019,205 B1 | 3/2006 | Fujisawa et al. |
| 7,020,635 B2 | 3/2006 | Hamilton et al. |
| 7,030,307 B2 | 4/2006 | Wedel |
| 7,030,311 B2 | 4/2006 | Brinkman et al. |
| 7,034,217 B2 | 4/2006 | Pachet |
| 7,081,580 B2 | 7/2006 | Brinkman et al. |
| 7,103,873 B2 | 9/2006 | Tanner et al. |
| 7,129,407 B2 | 10/2006 | Hiratsuka et al. |
| 7,151,214 B2 | 12/2006 | Barry |
| 7,157,638 B1 * | 1/2007 | Sitrick .................. 84/477 R |
| 7,164,076 B2 * | 1/2007 | McHale et al. .................. 84/616 |
| 7,174,510 B2 | 2/2007 | Salter |
| 7,288,712 B2 | 10/2007 | Uehara |
| 7,320,643 B1 | 1/2008 | Brosius et al. |
| 7,335,833 B2 | 2/2008 | Smith et al. |
| D573,605 S * | 7/2008 | Amacker .................... D14/488 |
| 7,404,202 B2 | 7/2008 | Hamilton et al. |
| 7,423,214 B2 | 9/2008 | Reynolds et al. |
| 7,435,178 B1 | 10/2008 | Tam et al. |
| 7,439,441 B2 | 10/2008 | Jarrett et al. |
| 7,446,253 B2 | 11/2008 | Knapp et al. |
| 7,453,035 B1 | 11/2008 | Evans et al. |
| 7,459,624 B2 | 12/2008 | Schmidt et al. |
| 7,472,525 B2 | 1/2009 | Griggs et al. |
| 7,486,791 B2 | 2/2009 | Ohbi et al. |
| 7,487,549 B2 | 2/2009 | Kawamoto et al. |
| 7,521,619 B2 | 4/2009 | Salter |
| 7,562,312 B2 * | 7/2009 | Rochford et al. ............. 715/848 |
| 7,663,044 B2 | 2/2010 | Katsuta |
| 7,675,514 B2 | 3/2010 | Ni et al. |
| 7,758,427 B2 | 7/2010 | Egozy |
| 7,773,121 B1 | 8/2010 | Huntsberger et al. |
| 7,799,984 B2 | 9/2010 | Salter |
| 7,806,759 B2 | 10/2010 | McHale et al. |
| 7,893,337 B2 | 2/2011 | Lenz |
| 7,910,818 B2 | 3/2011 | Kim et al. |
| 7,923,620 B2 | 4/2011 | Foster |
| 7,935,880 B2 | 5/2011 | Stoddard et al. |
| 7,982,114 B2 | 7/2011 | Applewhite et al. |
| 8,003,872 B2 | 8/2011 | Lopiccolo et al. |
| 8,026,435 B2 | 9/2011 | Stoddard et al. |
| 8,076,564 B2 | 12/2011 | Applewhite |
| 8,079,901 B2 | 12/2011 | Brosius et al. |
| 8,079,907 B2 | 12/2011 | Egozy |
| 8,080,722 B2 | 12/2011 | Applewhite et al. |
| 8,119,896 B1 | 2/2012 | Smith |
| D664,551 S * | 7/2012 | Boyer et al. ................. D14/486 |
| 8,317,614 B2 | 11/2012 | Mccauley et al. |
| 8,465,366 B2 | 6/2013 | Applewhite et al. |
| 8,481,838 B2 | 7/2013 | Smith |
| 8,586,849 B1 | 11/2013 | Smith |
| 2001/0035088 A1 | 11/2001 | Faecher |
| 2001/0039870 A1 | 11/2001 | Shimaya et al. |
| 2001/0040671 A1 | 11/2001 | Metcalf |
| 2001/0045153 A1 | 11/2001 | Alexander et al. |
| 2002/0004191 A1 * | 1/2002 | Tice et al. ..................... 434/350 |
| 2002/0088337 A1 | 7/2002 | Devecka |
| 2002/0157521 A1 * | 10/2002 | Shahal ..................... 84/477 R |
| 2002/0194984 A1 * | 12/2002 | Pachet ........................ 84/609 |
| 2003/0066414 A1 * | 4/2003 | Jameson ..................... 84/741 |
| 2003/0096556 A1 | 5/2003 | Fong` |
| 2003/0151628 A1 * | 8/2003 | Salter ......................... 345/773 |
| 2004/0055441 A1 | 3/2004 | Katsuta |
| 2004/0158462 A1 | 8/2004 | Rutledge et al. |
| 2004/0192430 A1 | 9/2004 | Burak et al. |
| 2004/0233239 A1 | 11/2004 | Lahdesmaki |
| 2004/0255758 A1 | 12/2004 | Klefenz et al. |
| 2005/0034591 A1 | 2/2005 | Chang |
| 2005/0211080 A1 | 9/2005 | Ueshima et al. |
| 2005/0235812 A1 | 10/2005 | Fallgatter |
| 2005/0252362 A1 | 11/2005 | Mchale et al. |
| 2006/0020469 A1 | 1/2006 | Rast |
| 2006/0050901 A1 | 3/2006 | Cohen et al. |
| 2006/0107819 A1 * | 5/2006 | Salter ........................ 84/470 R |
| 2006/0107826 A1 | 5/2006 | Knapp et al. |
| 2006/0151803 A1 * | 7/2006 | Wesner et al. ................ 257/103 |
| 2006/0196343 A1 | 9/2006 | Yung |
| 2006/0236850 A1 * | 10/2006 | Shaffer ......................... 84/724 |
| 2006/0245599 A1 | 11/2006 | Regnier |
| 2007/0000375 A1 | 1/2007 | Harrison, Jr. |
| 2007/0003073 A1 | 1/2007 | Iriarte |
| 2007/0044638 A1 | 3/2007 | Egan |
| 2007/0051226 A1 * | 3/2007 | Diaz ........................ 84/477 R |
| 2007/0066403 A1 | 3/2007 | Conkwright |
| 2007/0163427 A1 | 7/2007 | Rigopulos et al. |
| 2007/0163428 A1 | 7/2007 | Salter |
| 2007/0234885 A1 | 10/2007 | Schmidt et al. |
| 2007/0245881 A1 | 10/2007 | Egozy et al. |
| 2007/0256540 A1 | 11/2007 | Salter |
| 2007/0256541 A1 | 11/2007 | McCauley |
| 2007/0256543 A1 | 11/2007 | Evans et al. |
| 2007/0256551 A1 * | 11/2007 | Knapp et al. .................... 84/722 |
| 2008/0078281 A1 | 4/2008 | Katsuta |
| 2008/0113797 A1 | 5/2008 | Egozy |
| 2008/0115657 A1 | 5/2008 | Wakiyama |
| 2008/0122922 A1 | 5/2008 | Geng |
| 2008/0173162 A1 | 7/2008 | Williams |
| 2008/0200224 A1 | 8/2008 | Parks |
| 2008/0205669 A1 | 8/2008 | Michelet |
| 2008/0289477 A1 | 11/2008 | Salter |
| 2008/0318673 A1 | 12/2008 | Rofougaran |
| 2009/0038467 A1 | 2/2009 | Brennan |
| 2009/0064851 A1 | 3/2009 | Morris et al. |
| 2009/0098918 A1 * | 4/2009 | Teasdale et al. .................. 463/7 |
| 2009/0100988 A1 | 4/2009 | Villa et al. |
| 2009/0100991 A1 | 4/2009 | Lazovic |
| 2009/0104956 A1 | 4/2009 | Kay et al. |
| 2009/0191932 A1 | 7/2009 | Chiu et al. |
| 2010/0009755 A1 | 1/2010 | Burckart et al. |

(56) References Cited

U.S. PATENT DOCUMENTS

| | | | |
|---|---|---|---|
| 2010/0016079 A1 | 1/2010 | Jessop |
| 2010/0087254 A1 | 4/2010 | Sullivan |
| 2010/0137048 A1 | 6/2010 | Kim et al. |
| 2010/0137049 A1 | 6/2010 | Epstein |
| 2010/0216549 A1 | 8/2010 | Salter |
| 2010/0313736 A1 | 12/2010 | Lenz |
| 2011/0003638 A1 | 1/2011 | Lee et al. |
| 2011/0028218 A1 | 2/2011 | Gomes et al. |
| 2011/0203442 A1 | 8/2011 | Raveendran |
| 2011/0207513 A1 | 8/2011 | Cross |
| 2011/0247479 A1 | 10/2011 | Helms et al. |
| 2011/0259176 A1 | 10/2011 | Pillhofer et al. |
| 2012/0090446 A1 | 4/2012 | Moreno |
| 2012/0266738 A1 | 10/2012 | Evans et al. |
| 2013/0036897 A1 | 2/2013 | Parks |
| 2013/0065656 A1 | 3/2013 | Parks |

FOREIGN PATENT DOCUMENTS

| | | | |
|---|---|---|---|
| WO | 0195052 A | 12/2001 |
| WO | 2006042358 A | 4/2006 |
| WO | 2008103269 A | 8/2008 |
| WO | 2012125763 A | 9/2012 |

OTHER PUBLICATIONS

Greg Johnson. www.littleBigStar.net. Games with music instruments/make music by gaming. 2007 Accessed Jul. 5, 2010.
JamOrigin. www.jamorigin.com Amazing Guitar Recognition Engine. 2010. Accessed Jul. 5, 2010.
Offbeat-Guitarist-The Guide. http://offbeatforum.com/entry.php?2-OFFBEAT-Guitarist-The-Guide.com. 2010. Accessed Jul. 5, 2010.
DJ Hero 101. www.djhero.com. Available at http://www.djhero.com/game/djhero101. Accessed Feb. 3, 2010.
DJ Hero. Wikipedia. Available at http://en.wikipedia.org/wiki/Dj_hero. Accessed Feb. 3, 2010.
Guitar Hero. Wikipedia. Available at http://en.wikipedia.org/wiki/Guitar_Hero. Accessed Feb. 3, 2010.
Cakewalk © Pro Audio™ User's Guide Copyright © 1999 (604 pages).
Greg Johnson. www.littleBigStar.net. Games with music instruments/make music by gaming. 2007. Accessed Jul. 5, 2010.
JamOrigin. www.jamorigin.com. Amazing Guitar Recognition Engine. 2010. Accessed Jul. 5, 2010.
Karaoke Revolution, Konami, Nov. 2003 (6 pages).
Miracle Piano Teaching System, from Wikipedia, 1990; http://en.wikipedia.org/wiki/Miracle_Piano.
Miracle Piano Teaching System, Nintendo Entertainment System User's Guide, 1990; 1991 The Software Toolworks, Inc.; (34 pages).
PCT International Search Report of PCT/US12/29123; dated Jun. 20, 2012 (2 pages).
PCT Written Opinion of PCT/US12/29123; dated Jun. 20, 2012 (5 pages).
PCT/US08/01965, International Preliminary Report dated Sep. 3, 2009 (2 pages).
PCT/US08/01965, International Search Report, dated Jun. 9, 2008.
PCT/US08/01965, Written Opinion dated Aug. 1, 2008 (5 pages).
PCT/US08/01965, Written Opinion, dated Jun. 9, 2008.
Webpage: http://web.archive.org/web/20080309172950/http://www.owlnet.rice.edu/~elec301/Proiects02/realTime/TheProgram.htm, dated Mar. 9, 2008 (1 page).
Teach Me Piano (formerly Discovering Keyboard), Voyetra Technologies, 1997 (copyright 1996) (2 pages).
U.S. Appl. No. 60/902,066 entitled Music video game with stringed instrument input; Filed: Feb. 20, 2007.
Webpage: http://web.archive.org/web/20070218101428/http://www.sloud.com/technology/query_by_humming, dated Sep. 27, 2007 (2 pages).
Webpage: http://web.archive.org/web/20070809101756/http://www.starplaymusic.com/index.php, dated Aug. 9, 2007 (2 pages).
Webpage: http://web.archive.org/web/20070920223307/http://www.seventhstring.com/tuner/tuner.html, dated Sep. 20, 2007 (5 pages).
Webpage: http://web.archive.org/web/20070928013629/http:/www.ultrastarstuff.com/, dated Sep. 27, 2007 (2 pages).
Webpage: http://web.archive.org/web/20070929061546/http://www.noteworthysoftware.com, dated Sep. 29, 2007 (2 pages).
Webpage: http://marketplace.xbox.com/en-US/Product/Karaoke-Revolution/66acd000-77fe-1000-9115-d8024b4e0803, dated Aug. 27, 2012 (3 pages).
Webpage: http://web.archive.org/20070705093418/http://en.wikipedia.org/wiki/Karaoke_Revolution, dated Jul. 5, 2007 (4 pages).
Webpage: http://web.archive.org/web/20070712092222/http://www.nch.com.au/twelvekeys, dated Jul. 12, 2007 (1 page).

\* cited by examiner

INTERACTIVE GUITAR GAME DESIGNED FOR LEARNING TO PLAY THE GUITAR

CROSS-REFERENCE

This application claims the benefit of U.S. Provisional Application No. 61/117,053 filed Nov. 21, 2008 which application is incorporated herein by reference in its entirety.

BACKGROUND

Learning to play a musical instrument can be an enjoyable and rewarding experience. However, to develop proficiency in playing a musical instrument requires dedication, many hours of practice, and the application of proper playing techniques and methods.

Conventional learning tools and sources of instructional information for learning to play a musical instrument include music teachers, music books, audio tapes or compact disks (CDs), and video tapes. While each of these offers certain advantages, each is also limited in the quality of instruction or the manner in which the information is presented.

For example, a music teacher provides personally-tailored instruction, however the cost of the instruction is relatively expensive and each session is necessarily limited in both time and depth. Additionally, the student may be limited to learning the playing style and habits (both good and bad) of the particular teacher, which may limit the student's creativity and spontaneity. The practice material assigned by the instructor is also static and is therefore unable to accommodate and adjust to the student's individual progress or proficiency.

Music books provide a relatively low-cost alternative or adjunct to a music teacher. However, the material presented by music books is necessarily static and if the student has difficulty reading and interpreting music, particularly the tempo and rhythm, then music books provide a limited instructional capability. Additionally, music books are not interactive and provide no feedback to the student, making it difficult to develop a "feeling" for the music which is necessary to progress beyond purely technical or mechanical playing. Audio tapes or compact discs combine recorded songs and musical passages with instructional commentary and playing tips. But still, they lack visual instruction and feedback, which can make it difficult for the student to develop a feeling for the music.

What is needed is an effective way to provide interactive method and system for learning and practicing a musical instrument, which provides both audio and visual feedback, and an integrated learning approach.

SUMMARY OF INVENTION

The invention provides for an interactive guitar game designed for learning to play the guitar. Various aspects of the invention described herein may be applied to any of the particular applications set forth below. The invention may be applied as a standalone game engine system or as a component of an integrated software solution. It shall be understood that different aspects of the invention can be appreciated individually, collectively or in combination with each other.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "players" or "users" referred to herein can be individuals as well as corporations and other legal entities, such as schools or other educational institutions. Furthermore, the processes presented herein are not inherently related to any particular computer, processing device, article or other apparatus. An example of a structure for a variety of these systems will appear from the description below. In addition, embodiments of the present invention are not described with reference to any particular processor, programming language, machine code, etc. It will be appreciated that a variety of programming languages, machine codes, etc. may be used to implement the teachings of the invention as described herein.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

Some of the features of the invention are described as set forth in the following figures and description. A better understanding of the features and advantages of the invention will be obtained by reference to the following detailed description that sets forth illustrative embodiments provided in accordance with the invention.

DETAILED DESCRIPTION OF INVENTION

In the following detailed description, numerous specific details are set forth in order to provide a thorough understanding of the invention. However it will be understood by those of ordinary skill in the art that the invention may be practiced without these specific details. In other instances, well-known methods, procedures, components and circuits have not been described in detail so as not to obscure the invention. Various modifications to the described embodiments will be apparent to those with skill in the art, and the general principles defined herein may be applied to other embodiments. The invention is not intended to be limited to the particular embodiments shown and described.

An aspect of the invention provides an interactive game engine for learning to play a guitar. In one embodiment of the invention, any guitar, including a MIDI guitar, an OSC guitar, or a guitar using any other format or protocol, is connected to a computer or other platform. The computer or platform is capable of loading music, such that it can be displayed on a display screen in multiple ways, and allows the user to read the music and play along. The goal of the software or interactive game engine is for players to learn how to play a guitar. It is understood that any references herein to specific file formats do not limit the scope of the invention, but merely provide examples of file formats that may be used in the implementation of particular embodiments of the invention, and various other file formats, protocols, etc. are contemplated herein.

Figure 1:
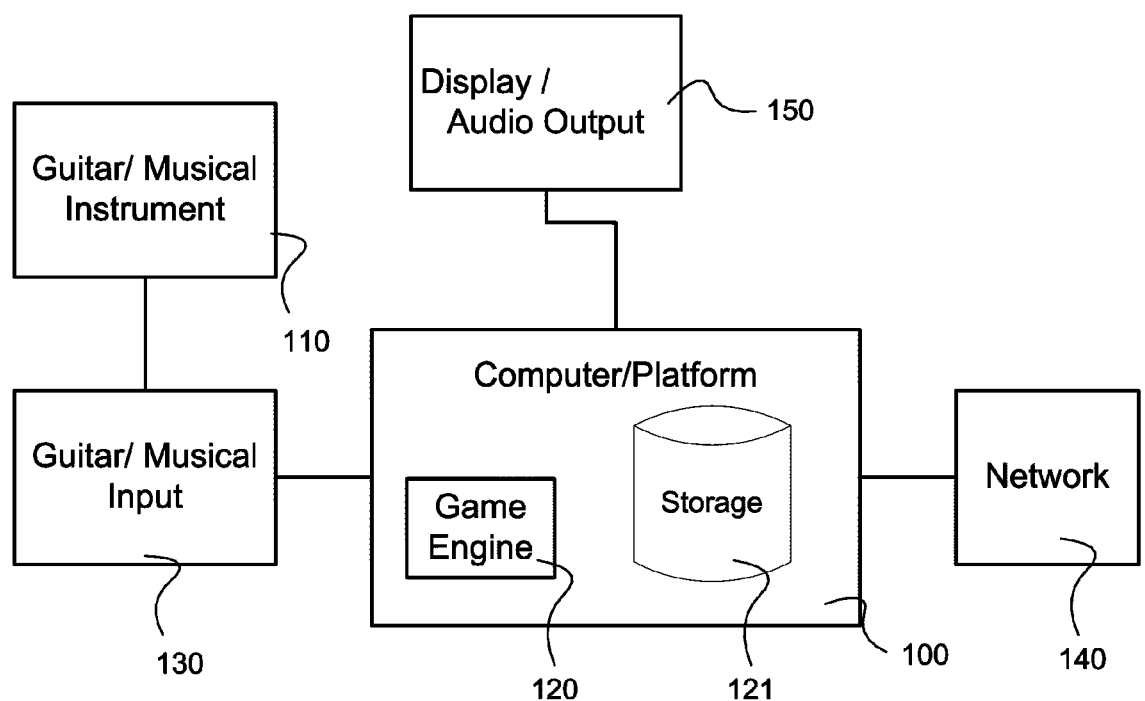
FIG. 1 illustrates an example of the various components of the interactive game system, in accordance with an embodiment of the invention.

FIG. 1 illustrates an embodiment of the various components of the system, with a computer or platform 100 which runs a game engine 120, a guitar or musical instrument 110 providing a guitar or musical instrument input 130, and video and audio outputs 150. The system may also be optionally connected to a network 140. The guitar 110 may be any type of guitar (or other musical instrument), which the user can play, and may provide an input into the computer or platform 100, identifying which strings and frets are being played by the user or the velocity or timing with which the user plays certain notes or chords. The input may be a composite audio signal or an isolated or discrete audio signal. The game engine 120 may use and process this information, and may be coupled with a computer or other platform having a storage or memory 121.

Figure 2:
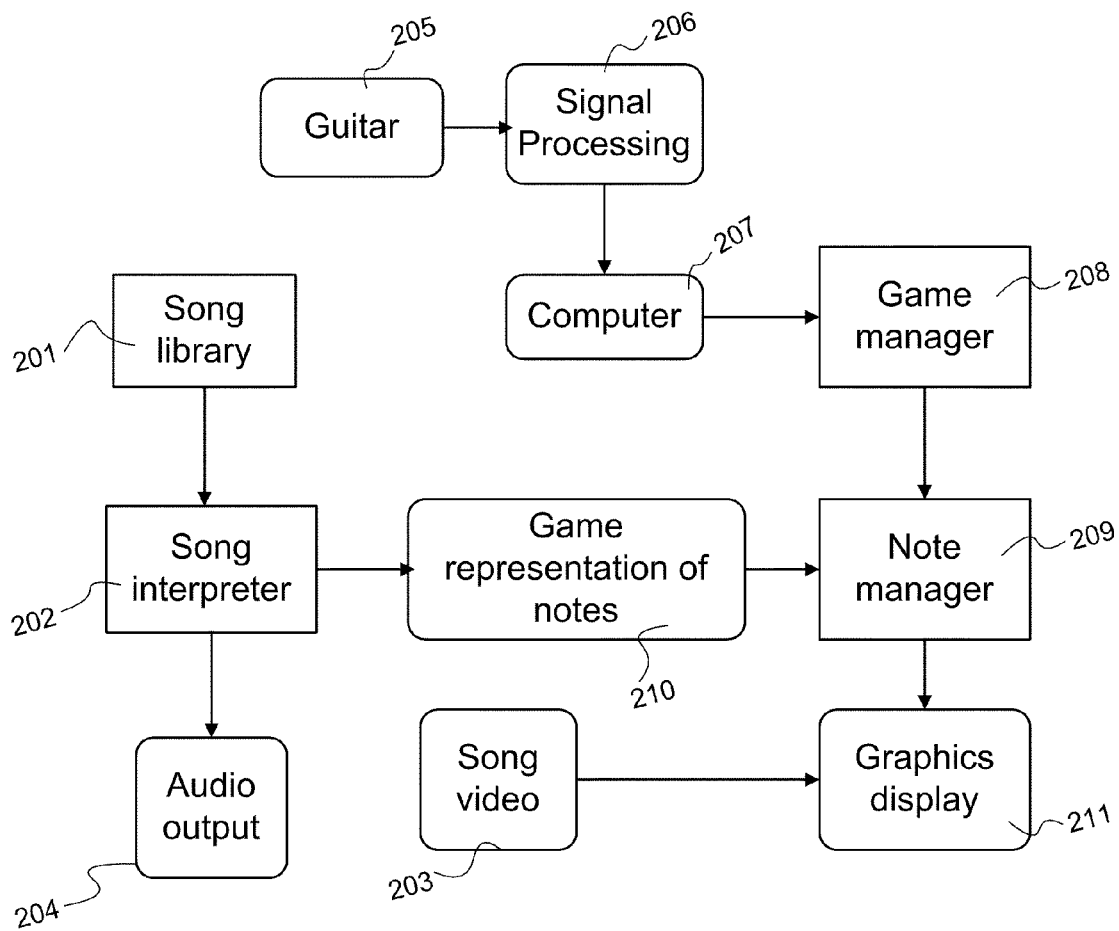
FIG. 2 shows a flowchart of how information flows while playing the interactive game, in accordance with an embodiment of the invention.

Referring to FIG. 2, one example of how information flows during game-play is shown. A song may be selected from a song library 201. A song interpreter 202 may produce a game representation of notes 210, to be displayed by the note manager 209 on the graphics display 211. At the same time, the song provides audio output 204. Viewing this graphics display and hearing the audio output, a user or player may play either a note or chord on the guitar 205. The signal processing module 206 may convert the analog or digital audio signal produced by the guitar into a digital signal read in by the computer 207 or other platform. The note manager 209 may process the analog or digital audio signal (such as a MIDI signal or signal of another format), and compare it against the selected song. The signal may be a composite signal, or the signal may be an isolated or discrete signal. The analog or digital audio signal may be taken directly from a standard guitar out (by way of a ¼" cable from the guitar to an input that the computer can handle (such as a ⅛" or USB) or from a hex pickup (six separated isolated channels of audio). The audio signal may be processed and used to provide feedback on the location, positioning, attack, velocity and action as the user plays their guitar. Thus, the system may process the signal by polyphonic pitch detection (for composite signal parsing), or may process isolated/discrete signals. Data derived from the comparison may be fed back to the game manager 208 and further processed to update the graphics display 211. Further, a song video 203 which corresponds to the song selected from the song library 201 may be played in the background via the graphics display 211.

The song may be a compressed archive of the following resources: a description XML file giving information about the song's title, author, and the location of the MusicXML file (or file of any other format). The file may be a standard file format used for describing both the tonal representation of the song, as well as formatting information. The file may also provide information about chord names, additional MP3 tracks (or other types of tracks), or the video file to play in the background. When the file is read in, it may be converted into both a graphical representation (for display), as well as a MIDI representation (or representation in any other format). The note manager 209 may display the notes graphically, depending on notations that may be specified in the file. The note manager may display the notes to the graphics display 211 in time with the audio output 204 of the song selected from the song library 201. The notes may be displayed in tablature, a form of musical notation which tells players where to place their fingers on the guitar. The notes may also be displayed in modern notation which uses a five-line staff. It is understood that various types of file formats, including but not limited to the XML or MusicXML file formats, are contemplated.

Figure 3:
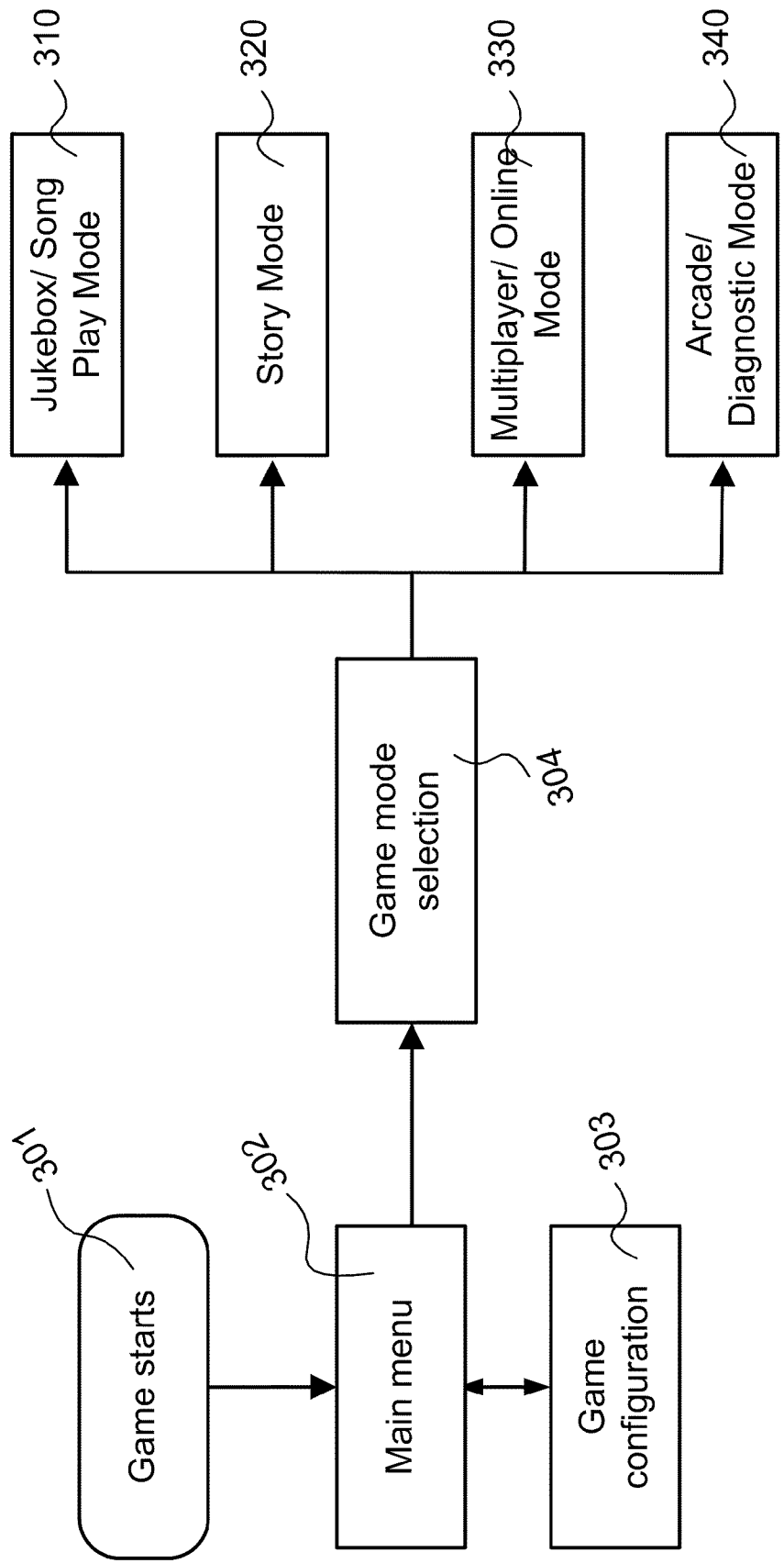
FIG. 3 shows an example of the overall game architecture, in accordance with an embodiment of the invention.

FIG. 3 shows the choices to the user which are available when the game starts, and also displays the overall game architecture. The game allows for four different modes to be selected from the game mode selection menu 304: Jukebox (or Song Play) mode 310, Story mode 320, Multiplayer (or Online) mode 330, and Arcade (or Diagnostic) mode 340. The game also may have a game configuration module 303, which allows the user to set certain game preferences such as: volume, game difficulty, library repository options, and network configuration.

Figure 4:
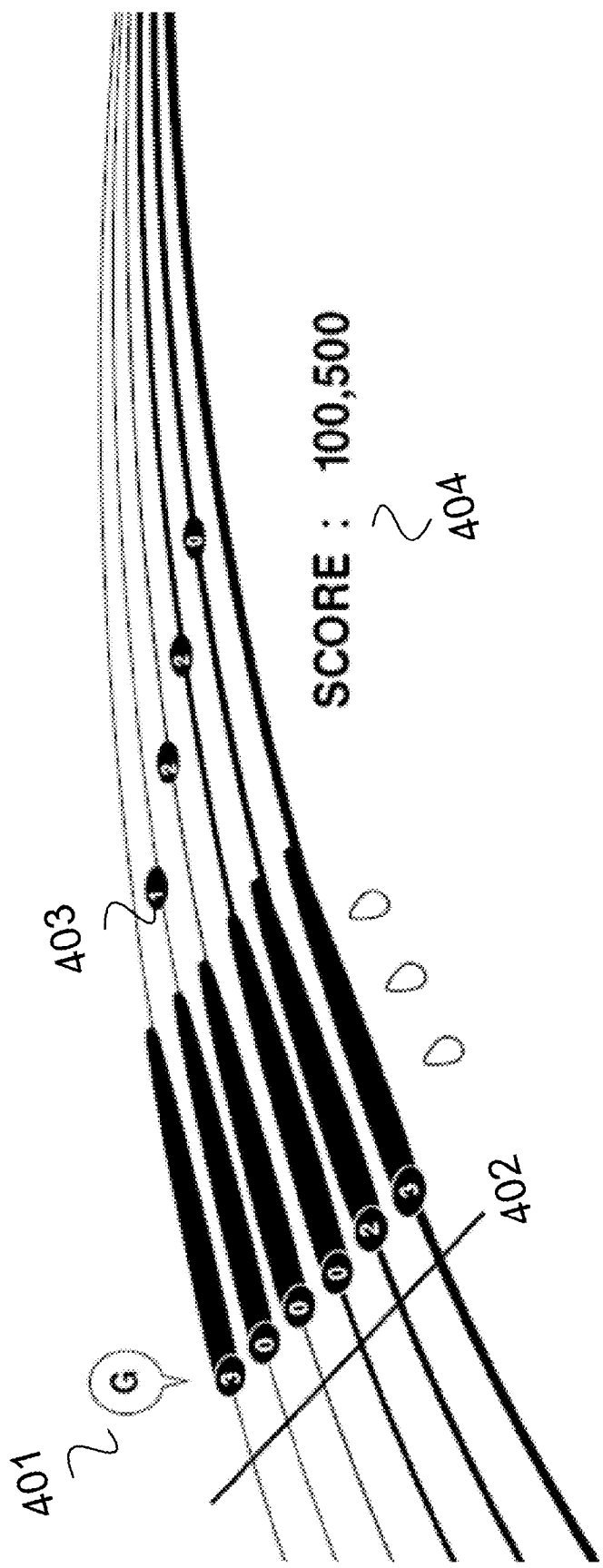
FIG. 4 shows one example of a graphical representation of a screenshot of a moving notation on a screen, in accordance with an embodiment of the invention.

Referring to FIG. 4, one example of a graphical representation is shown. The image presented in FIG. 4 is a snapshot of a moving video image which is shown on a display screen to a user. The moving image is a moving (or scrolling) notation which prompts the user to play certain chords or notes, such as indicated by a symbol 401 directed to the chord name or displaying tablature of the strings to be played, and the manner in which to play them (i.e. the length of the chord in the song). In FIG. 4, the user is prompted to play the G-chord (the $1^{st}$ string at the $3^{rd}$ fret, the $5^{th}$ string at the $2^{nd}$ fret, and the $6^{th}$ string at the $3^{rd}$ fret, with the $2^{nd}$, $3^{rd}$, and $4^{th}$ strings open). As the song plays, the display moves, such that the notation moves and progresses in time with the song. In the example given in FIG. 4, the chords or notes move from the top-right side of the screen to the bottom-left. As shown in FIG. 4, upcoming notes 403 are also displayed and move from the top-right side of the screen towards the bottom-left. When the notes approach the hit-line or hit-area 402, the user is supposed to play the notes.

The moving (or scrolling) notation is sometimes referred to as a "note highway" and as the song progresses, symbols which may be colored markers or gems indicate notes that travel across the screen in time with the music. The symbols' colors and positions may match those of the frets on a guitar. Once the symbol reaches a "hit zone," the player must play the indicated note.

As the user listens to the song and watches the display on a display screen in any version of the views described herein, the user may attempt to play the chords and notes that he or she is prompted to play. Depending on the user's accuracy with regard to which fret and strings are actually played, the velocity with which each note or chord is played, and the timing of the user's play, the game engine may calculate a score or provide the user with other feedback as to his or her accuracy. As shown in FIG. 4, the score 404 may be shown as a numerical score.

Figure 5:
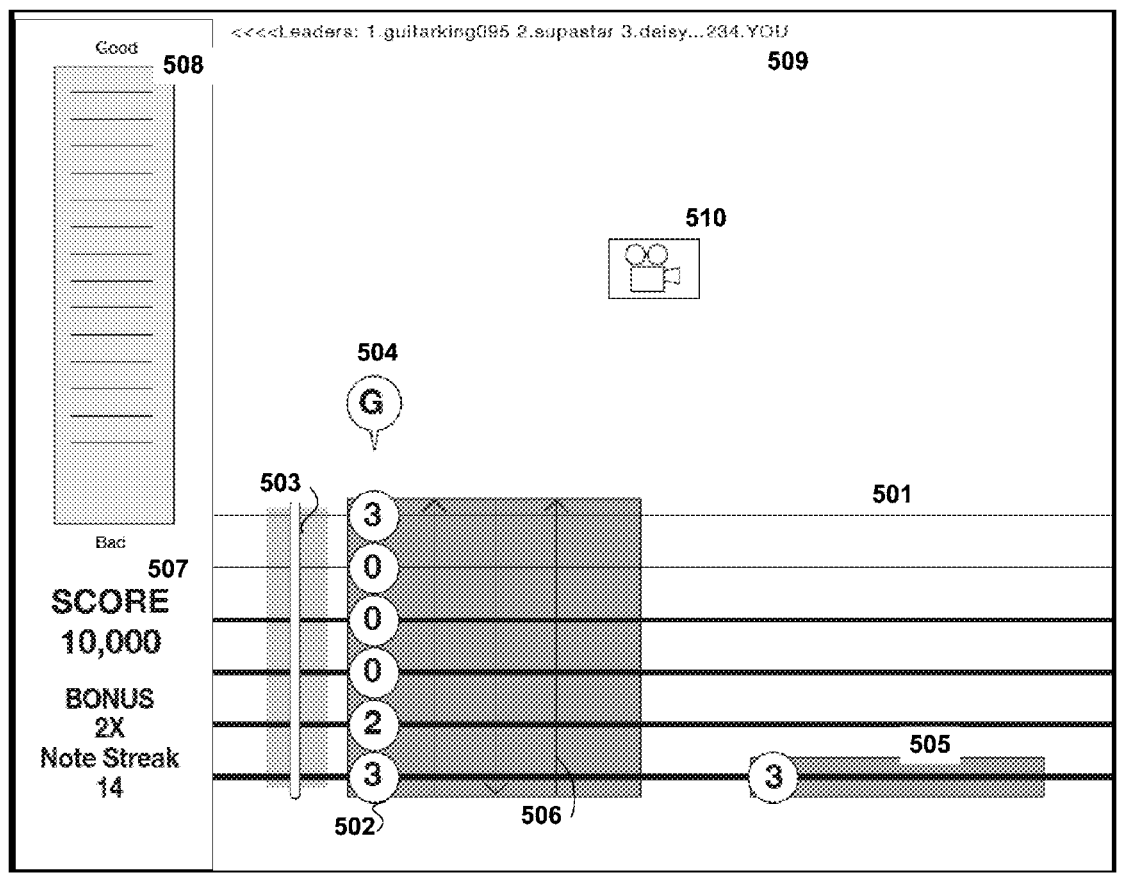
FIG. 5 shows another example of how notes may scroll across a display screen, in accordance with an embodiment of the invention.

Referring to FIG. 5, another example of how notes may scroll across the display screen for a user to play is shown. The six strings of the guitar 501 may be displayed across the screen. As a song plays, notes or tab bubbles 502 may move across the screen from the right-side to the left-side in time with the song. The hit bar/zone 503 may indicate when the notes 502 are supposed to be played. When the notes 502 reach the hit bar 503, the user is supposed to play the notes 502. The notes are either shown as individual notes with their duration of play or duration bar, 505 for example, or as chords, 502 for example. If a chord 502 is being played, the name of the chord 504 may also be displayed. Further, the stroke-direction may be shown in the duration bar by the strum indicator 506, by the arrows indicating which direction the user is supposed to stroke the chord. A power-up indicator may also be displayed for game play. For example, if a user is able to play a certain number of notes accurately, a power-up indicator may display a note that the user may triple their score if they get the next X number of notes correct. Thus, a power-up indicator may display some kind of score modifier that may become available to a user.

As the user listens to the song and watches the display on the display screen, the user may attempt to play the chords and notes that he or she is prompted to play. Depending on the user's accuracy with regard to which fret and strings are actually played, the velocity with which each note or chord is played, the direction of the strokes, and the timing of the user's play, the game engine may calculate a score and score modifiers 507 or provide the user with other feedback 508 as to his or her accuracy and performance, in the form of a success meter, for example. Further, to immerse the user or player in the music, a movie or video 510 may be played in the background.

Figure 6:
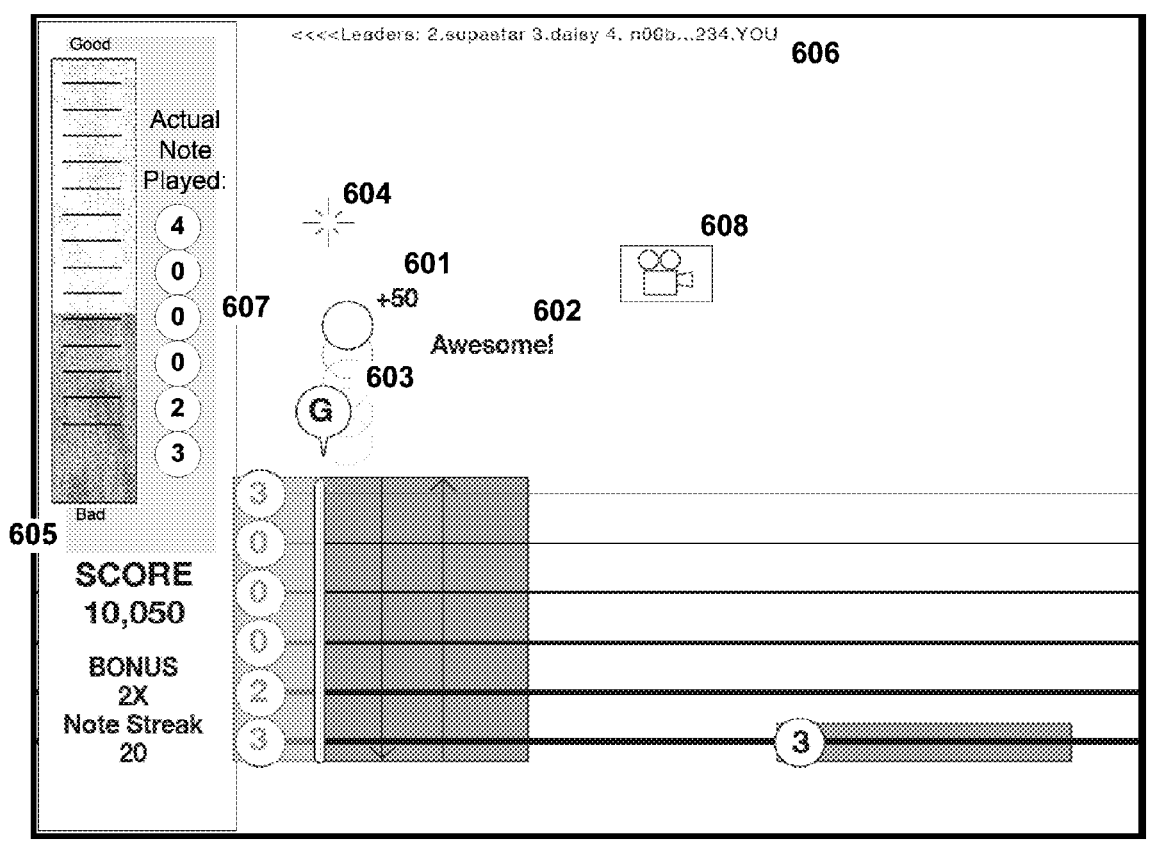
FIG. 6 shows an example of visual feedback displayed on a display screen, in accordance with an embodiment of the invention.

In FIG. 6, a more detailed example of what the visual feedback that a user experiences is shown. Whenever a user plays a correct note, points 601 may be rewarded along with a textual representation of the score 602. Thus, the game engine may provide both a numeric indicator for points scored 601 and a qualitative indicator for a correctly or incorrectly played note 602. For example, the textual representation of the qualitative indicator 602 may be words of encouragement or praise such as, "Awesome!" as shown in FIG. 6. The notes or chord 603 may visually appear to float from the block to which they were attached, and eventually fade and disappear as 604. Thus, the graphical indicator for the correctly played note 603 may fade and disappear 604. As the chords and notes are played and the feedback is presented to the user, the performance or success meter 607 (or score and score modifiers 605) may be updated. In addition, the actual note played by the user may also be indicated. Further, the game may provide for a background audience audio feedback, which provides audio output mimicking an audience watching the user's performance. As the user plays a particular song, the volume of the background audiences may be updated in accordance with his or her performance. Thus, the game engine may provide new audio and video feedback based on the success or failure of the user.

Figure 7:
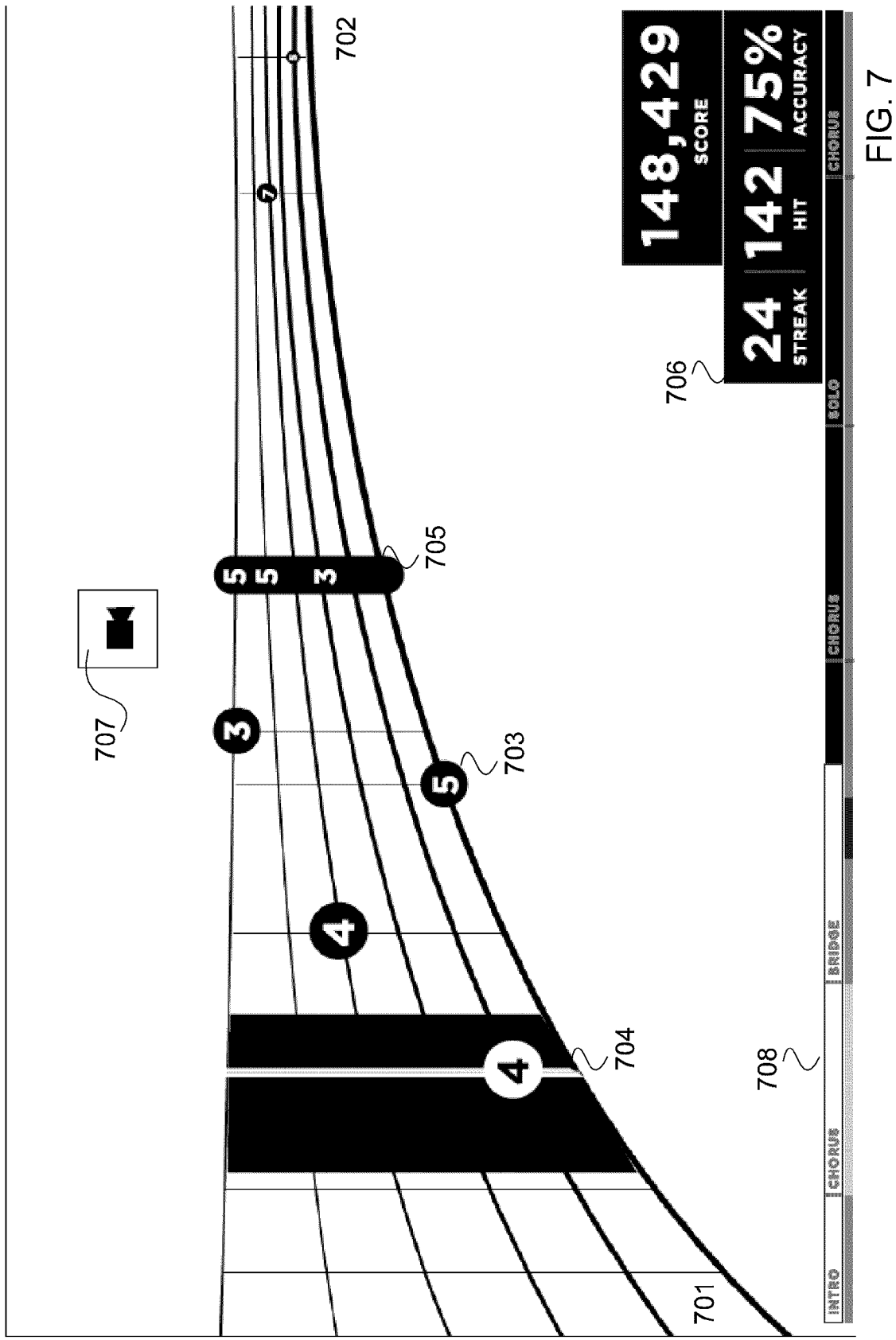
FIG. 7 illustrates an example of a timeline view of notation displayed on a display screen, in accordance with an embodiment of the invention.

Many different views of the scrolling notation are possible. For example, FIG. 7 illustrates an example of a timeline view of the scrolling notation, in accordance with an embodiment of the invention. As shown in the timeline view, the notes 703, 705 may scroll from the right side 701 to the left side 702. There may also be a video in the background 707 and an audio track timed to the scrolling notes 703, 705. Before play begins, the user may be given a one bar count off, derived from the tempo and time signature of an audio file. As the notes reach a region towards the left side of the screen (the hit area 704), the user may play those notes on their guitar. The user may receive a score 706, which is updated as the user plays along, to reflect how close to the actual hit line the user played the note, or if the user missed the note all together. The score may also reflect a note streak (how many notes the user has correctly and accurately played in a row), the number of hits (how many notes the user has played correctly in the song or exercise) and a accuracy rating (the percentage of notes that the user has played correctly in the song or exercise). Depending on the user's action, the view may also give the user visual feedback by changing the representation of the note. As the user's score changes, different crowd noises may be provided as audio feedback.

If there are no notes on the screen, the interface may display the next offscreen note on the far right of the screen so as to alert the user of an upcoming note. The interface may also display certain metrics regarding the user's performance, including a score and a current note streak 706. Additionally, the interface may display a timeline for a whole song, broken into sections, showing the user where they are and giving a general sense as to how the user did on a particular section of a song. For example, a user's progress may be tracked by a progress bar 708, which indicates how far along the user is in the song, or if the user is currently playing in the introduction, chorus, bridge, a solo breakout, etc. The interface elements may be done as 2D overlays onto a 3D space. The lines representing the guitar may be 3D curves starting at the right side far back 702, expanding and coming nearer as they approach the left side of the screen 701. The inside of the note bubble 703 may contain the number of the fret to be pressed. A bubble containing the note or chord name may also scroll with any note or chord above the strings.

Figure 8:
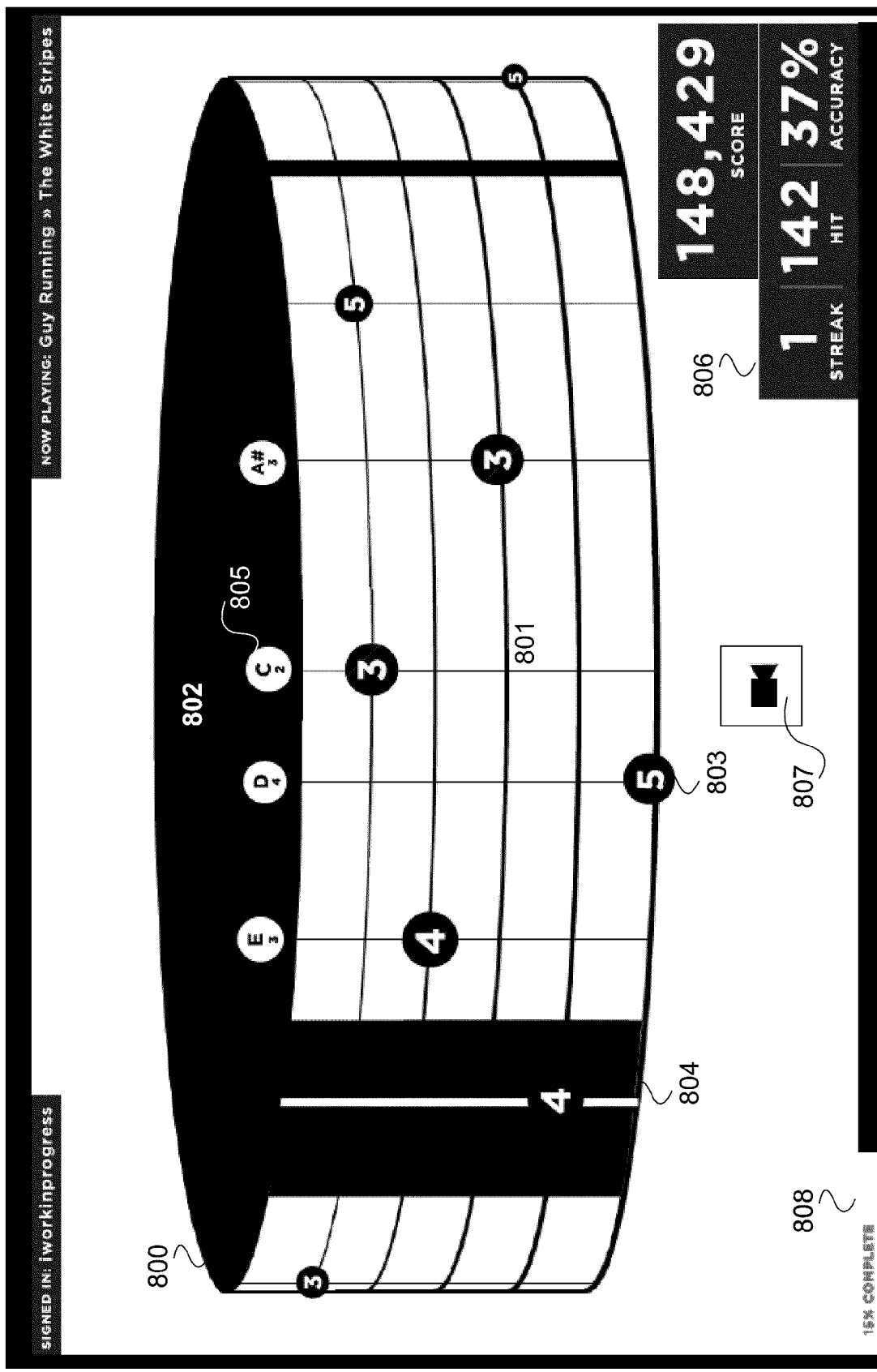
FIG. 8 illustrates an example of a carousel view of notation displayed on a display screen, in accordance with an embodiment of the invention.

FIG. 8 illustrates an example of a carousel view of the scrolling notation, in accordance with an embodiment of the invention. In the carousel view, note bubbles with frets 803 (or other note symbols) may also be displayed, in addition to note or chord names above the strings 805. Rather than scrolling from left to right, however, the notes may circle around clockwise and rotate. Thus, the notes will repeat, after the carousel completes each rotational cycle. The carousel 800 may be semi-transparent or translucent such that some of the notation is displayed in the foreground (or a front portion) 801, and some of the notation is displayed in the background (or a back portion) 802. Because the carousel 800 may be translucent, notation displayed in the background may be viewable by the user through the foreground. As the notation rotates, the notation displayed in the foreground 803 is rotated to the background 802, and vice versa (i.e. the notation displayed in the foreground may travel along the carousel to the background, and vice versa, in a circular manner). If the note is played by the user within the time that the note symbol is displayed within a hit zone 804, the note may change in color in a certain number of stages, or other real-time feedback of the user's accuracy with regard to the notes and timing may be provided to the user, such as in a score box 806. For example, there may be three stages, and when a user plays a note within the hit zone 804, then the note may be change in color (i.e. from the color indicating stage 1 to the color indicating stage 2. Alternatively, if the user misses a note, then the note may change in color (i.e. from the color indicating stage 2 to the color indicating stage 1). In carousel view, a game may be complete when the user has gotten a percentage of the notes from stage 1 up to stage 3, for example. The score may be a function of how many notes over the minimum percentage that the user got, as well as how many cycles it took to do it in. The progress bar 808 may indicate how many notes the user has gotten up to the completion point by a percentage. If the user takes longer than ten cycles, for example, the user may fail and receive no points. The carousel view may be used to work on sections of songs. The display may also include a 1 bar count off at the beginning and a second or so of dead space at the end so that the track loop can be faded out and then in again as it cycles through. In carousel view, a video 807 may be played in the background, or a user may select any other type of static or dynamic image or video to be displayed as the background while the user plays the song.

Figure 9:
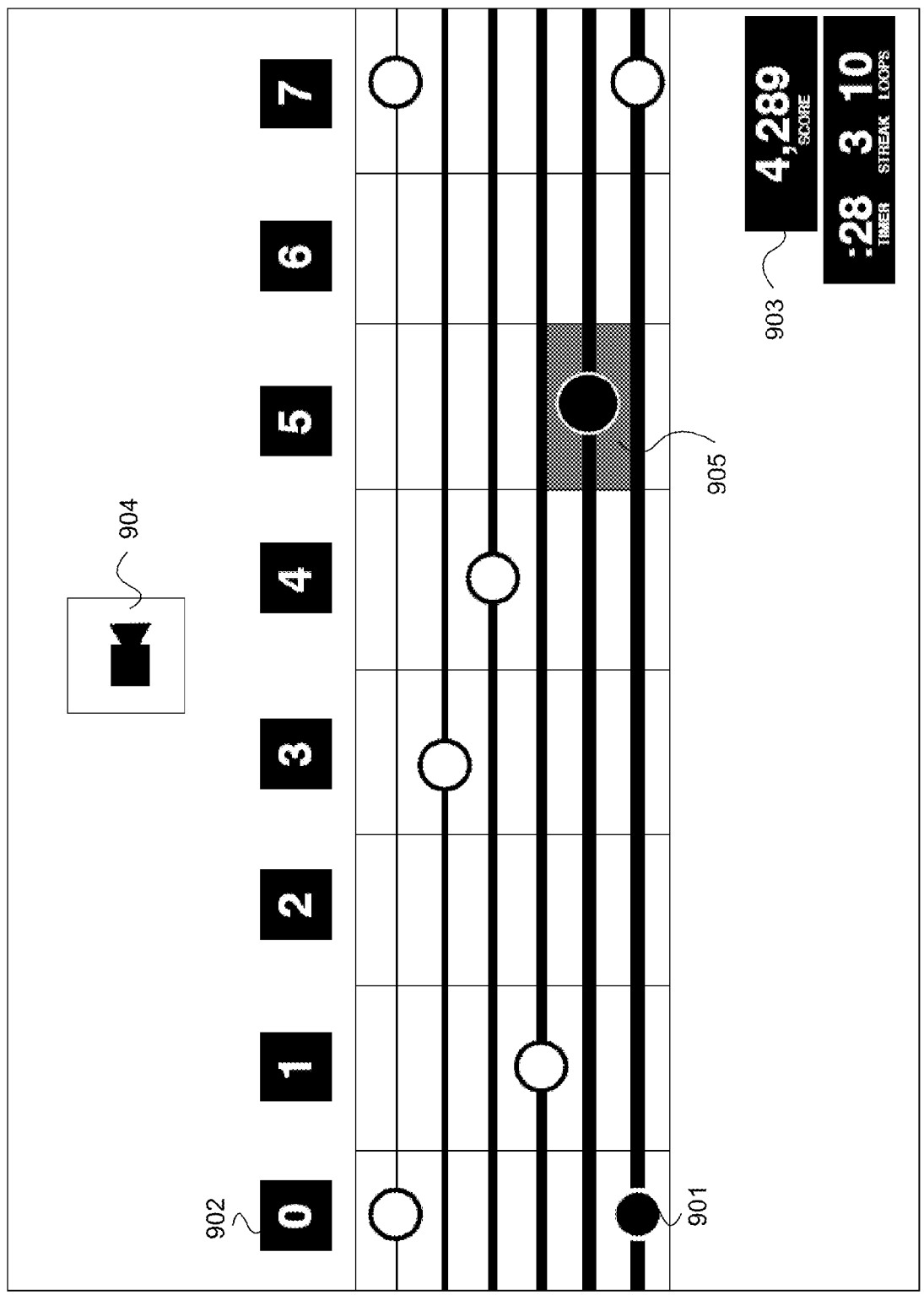
FIG. 9 illustrates an example of a guitar neck view of notes displayed on a display screen, in accordance with an embodiment of the invention.

FIG. 9 illustrates an example of a guitar neck view of the scrolling notation, in accordance with an embodiment of the invention. In the guitar neck view, notes 901 may be displayed in a two-dimensional grid on top of a representation of a guitar fretboard. Also, a line of boxes of the displayed notes' names 902 may be shown. When the user has played or has missed a note, the note color may be updated accordingly, and the next note in line may be highlighted, such as is shown by 905. The view of the fretboard may be moveable to accommodate the positions of the notes being displayed. For example, if the current chord is on the third and fifth frets, the view may contain at least the upper third of the fretboard. Then if the next note is on the fifteenth, sixteenth and seventeenth frets, the view may contain the middle third of the fretboard. The transition from one part of the fretboard to another may be smooth and quick. The view may also display a progress bar at the bottom, for example, to show the user how far through the song that he or she is, or the user's score or other relevant feedback may be shown in a scorebox 903. A fullscreen video 904 may also be shown in the background.

Figure 10:
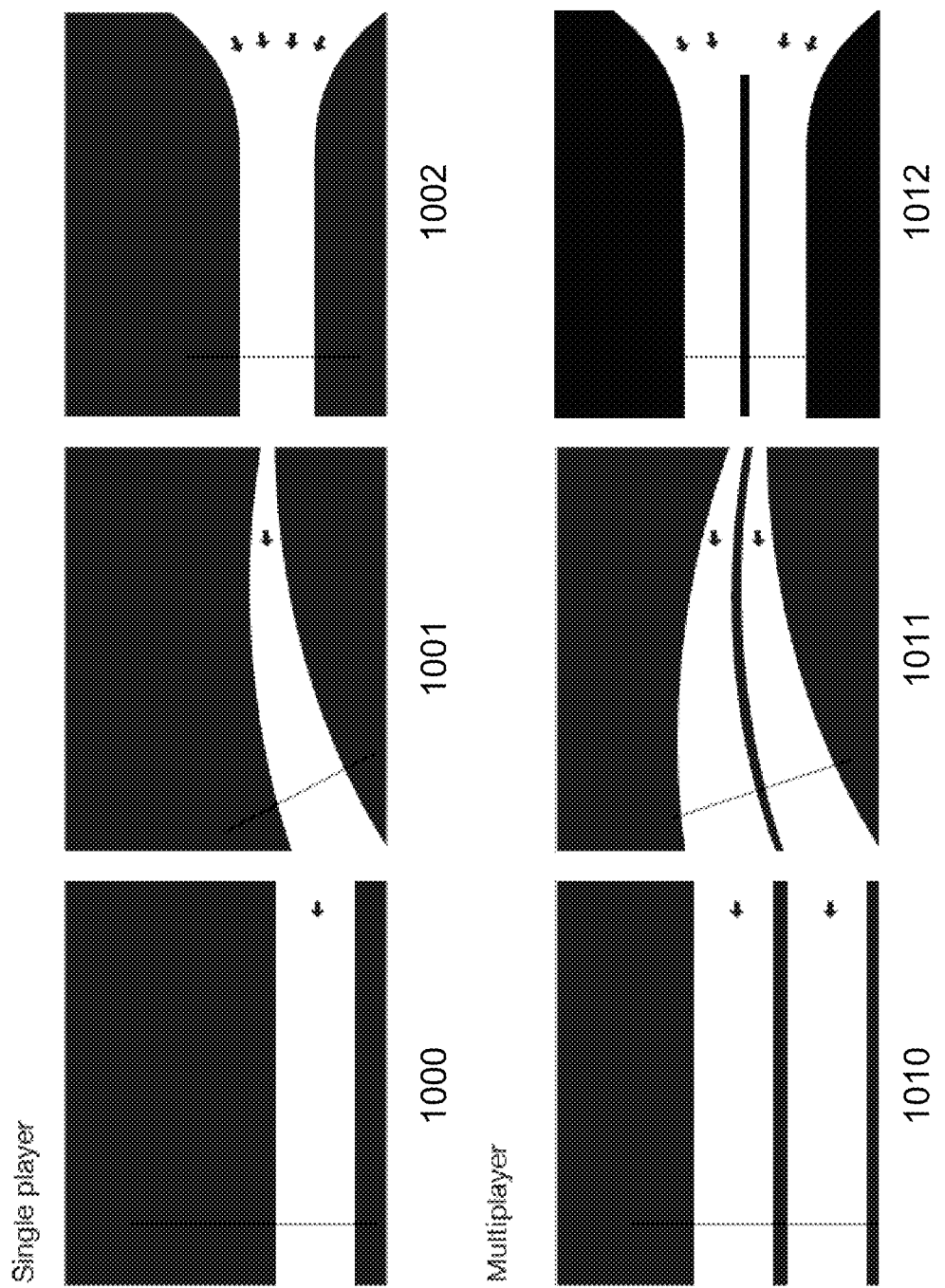
FIG. 10 shows examples of various scrolling methods for the tablature notation or notes on a display screen, in accordance with an embodiment of the invention.

Further, as shown in FIG. 10, when displaying the notes scrolling across a screen in a tablature notation, various scrolling layouts (or arcs) can be employed by the various embodiments of the invention. As can be seen, in a single player mode, the scrolling may be simply horizontal, or may be curved in one or more directions such that the notes travel in an arc. Further, in multiplayer modes, the scrolling can be similarly horizontal or curved in one or more directions. The scrolling notation may appear as 2D "Linear" scrolling (1000, 1010), 3D "Racetrack" scrolling (1001, 1011), or 2D "Y" scrolling (1002, 1012), as shown in each of the figures in FIG. 10. In each case, the notes scroll across the screen in a tablature notation, but the direction of scrolling and shape of scrolling may differ in various embodiments of the invention.

It is understood by those of ordinary skill in the art, that many different variations of this display image are contemplated by the invention, and the invention is not limited to the specific details of the examples as shown and described herein.

Figure 11:
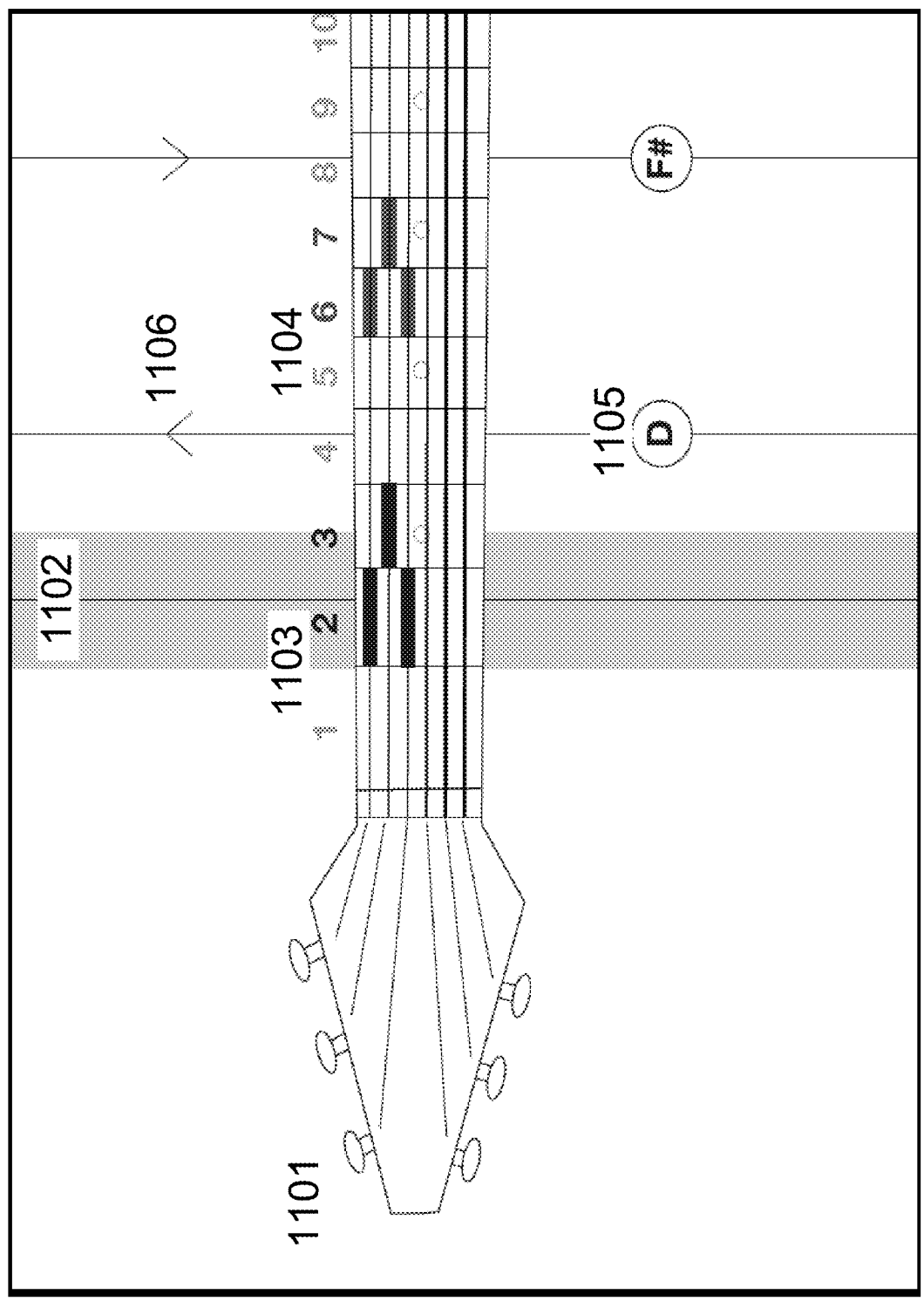
FIG. 11 shows an example of displaying a visual graphical representation of a guitar on the screen, in accordance with an embodiment of the invention.

Thus, the interactive game engine may serve as a tool for guitar players to visually learn how to play the guitar. In FIG. 11, as described above, a visual graphical representation of the guitar 1101 may be displayed on the display screen. The user can easily compare this to their own guitar that they are learning how to play. In one embodiment of the invention, the chord that is to be played is represented by a shaded bar or hit line/zone 1102 that runs vertically across the screen. As the note or chord is supposed to be played, the opacity of the notes on particular frets may change, as can be seen near 1103. On deck, with a different perhaps lighter opacity or a different color, the next notes to be played 1104 may be shown. A scrolling line may also indicate hit time, the chord name 1105, and the strum direction 1106.

Figure 12:
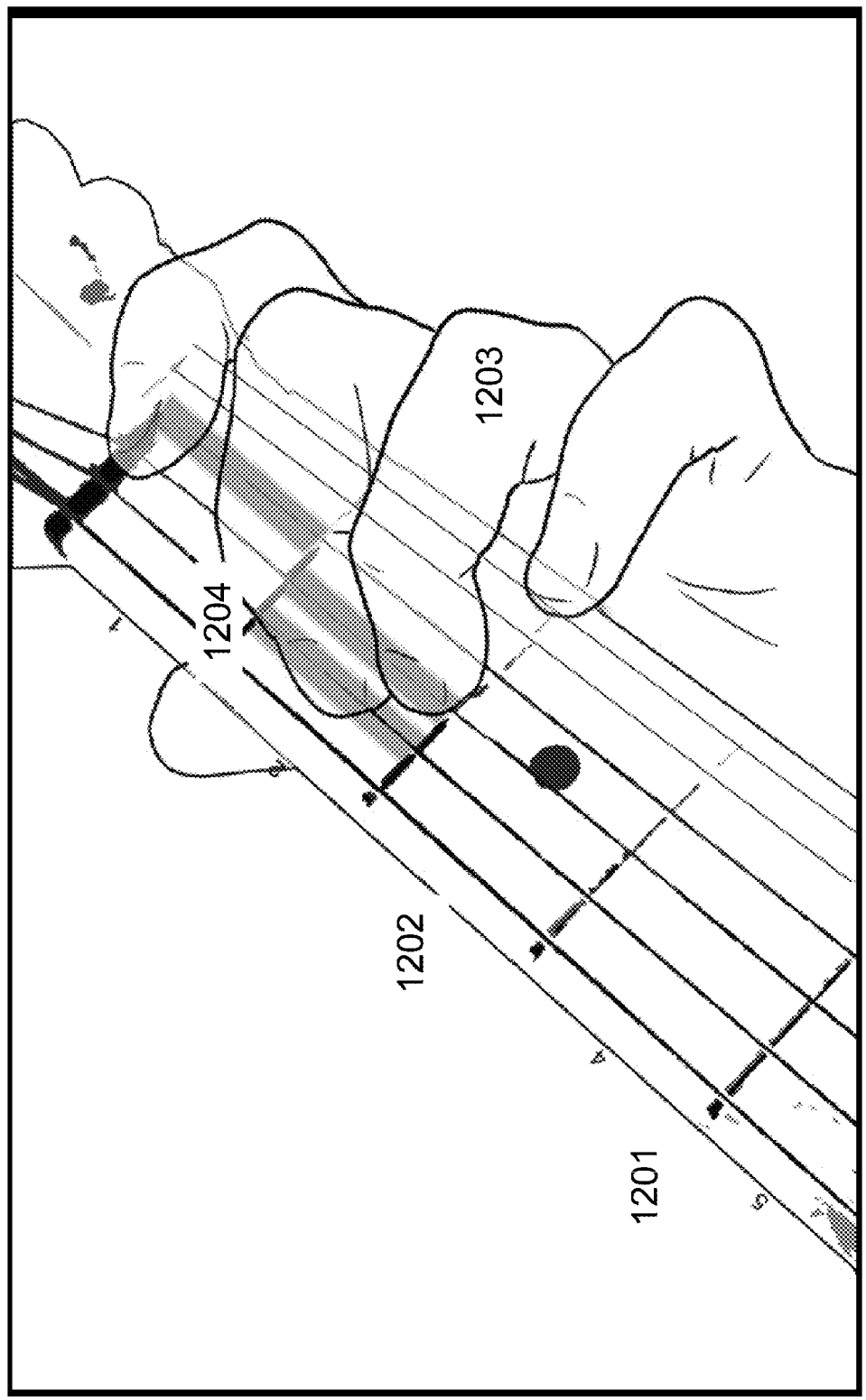
FIG. 12 shows an example of a display where the actual fingering of a chord or note is displayed, in accordance with an embodiment of the invention.

The display of the game engine can be varied in several ways and may include (a) a display where notes scroll across a screen in a tablature notation, as described above, or (b) a display where the actual fingering of the chord is displayed as shown in FIG. 12, and/or (c) interactive videos. For example, in an interactive video display, the guitar neck 1201 may be shown with the guitar fret numbers 1202 labeled. As shown in FIG. 12, the display may show actual fingering of the chord by a semi-opaque animated hand position indicator 1203, and may change as the notes or chords in the song are played. A user then, may be able to improve upon his or her finger placement by mimicking what is shown on the display screen. The display may show, by indicating finger placement, which frets and which strings are being utilized, and may also show the direction of the stroking of the chord or notes. The display may, in addition, highlight the frets to be pressed 1204. Many different types of display are contemplated by the invention, and the invention is not limited to the specific mini-games as described herein.

The view may also be varied such that the tab may be displayed in a standard way such that the vertical string order is ascending, and also in an inverted tab display such that the vertical string order is reversed with the low string on top and the high string on the bottom. Further, the guitar neck may be displayed for a right-handed player, and may also be flipped on a horizontal axis so as to mirror that of a left-handed perspective. Further, as described, a finger view may also present a real-time three dimensional render or video of the proper finger positions or location for a note or chord.

As described earlier, when the game starts, the user may choose from four different game modes from the game selection screen: Story mode, Jukebox (or Song Play) mode, Arcade (or Diagnostic) mode, and Multiplayer (or Online) mode.

Figure 13:
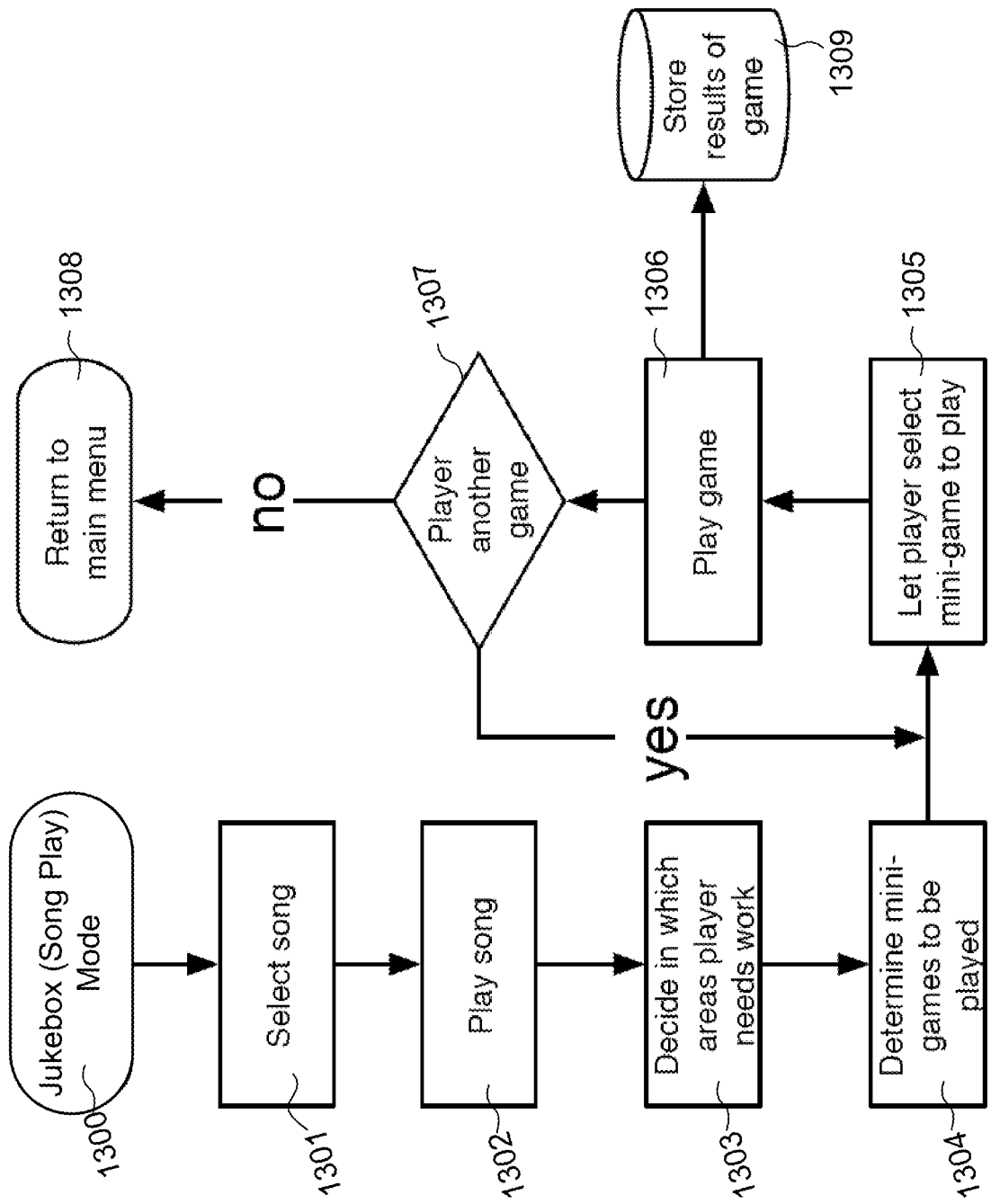
FIG. 13 illustrates a flowchart of what happens during Jukebox (or Song Play) mode of the game, in accordance with an embodiment of the invention.

In Jukebox (or Song Play) mode, the game engine may allow a user to target certain weaknesses in technique or with certain songs, and practice and improve upon those particular weaknesses. A user may, in Jukebox (Song Play) mode, play through tracks of a song using tablature or note names. The game engine allows a user to learn and grow by learning core elements of certain songs and the mechanics needed to play them. A beginning user may choose to view the song in a view displaying tablature, and a more advanced user may be able to play through a song just using note names or chord diagrams. Referring to FIG. 13, when the user chooses the Jukebox (or Song Play) mode 1300, the user may select a song 1301. The user may either play the song 1302 or may defer to the game engine to decide which areas of the song that the player or user needs to work on 1303. The song may be broken out into certain sections or parts, which represent different levels of play. Alternatively, different levels may be different songs of different levels of difficulty. Or, the different levels may represent different playing skills that a guitarist would like to learn or need to practice or work on. One skilled in the art can appreciate that the different levels may be defined in many ways, and that the invention is not limited to the specific descriptions or examples as described herein.

In Jukebox (Song Play) mode, a user may choose to play a song 1301 from any track in their library 1301. The library may include pre-installed music or music purchased or downloaded from a music store. Users may choose to view tablature or notes in a timeline view.

If a user has trouble with a particular section of a song, the user (or the game engine) may switch to a carousel view and have the user repeat that section until the user improves. Thus, the game engine may assess the user's past performance and provide the user with exercises or games to target the areas that the user needs to work on in step 1303, and the game engine may then appropriately determine or form a selection of mini-games to be played in step 1304. As the user selects the mini-game from the options provided by the game engine to play in step 1305 and plays the game in step 1306, the user is practicing various skills or songs or sections of songs and targeting certain weaknesses in order to improve overall performance. Users may also adjust the speed, complexity and sub-mode (or mini-game) that they play. The results of each game played may be stored in step 1309. After the user plays a mini-game, the user may play another game 1307 or return to the main menu 1308.

In one embodiment, Jukebox (or Song Play) mode may have three different sub-modes (or mini-games): Wait, Challenge, and Stage Ready. In Wait sub-mode, a user may be allowed to play along with a song, and the goal might be to play along without missing a note. The notation may be presented in a right-to-left scrolling manner, and there may be a music video playing in the background. The game may wait until the user has played the necessary notes correctly before progressing. Wait sub-mode may mimic what an individual does when they are trying to figure out a song alone in their room. However, because the real song and video are playing along with the user, Wait sub-mode may create an emotional compulsion to play in time, positively reinforcing when the user is playing correctly in time with the song. In addition to the emotional compulsion, the timing may create a win/loss metric. For example, the user may only have thirty seconds of overtime to play the song, and if the user does not complete the song within this period of time, then the user may be required to repeat the game. A user's score when playing this game may be based on "Time Scoring" as further described below.

In Challenge sub-mode, the user will be faced with the same game as in Wait sub-mode, except the system may not longer wait for the user. Thus, the user is evaluated on accuracy and timing. This information may be tracked and if the user is having trouble on a particular section of a song, or with particular chords or notes, then the user may be directed towards other mini-games or sub-modes which will help the user master that aspect of play. The user may also be given real-time feedback on accuracy, position, playing, correct streaks, and duration. Further, there may be a music video playing in the background. A user's score when playing this game may be based on "Standard Scoring" as further described below.

In Stage-Ready sub-mode, the notation representation may be omitted. The user may be shown only a music video, and whether the user is getting her notes correct or incorrect. The goal of this sub-mode may be to display true mastery of a song. The user may also be given real-time feedback on accuracy, position, playing, correct streaks, and duration. Further, there may be a music video playing in the background. A user's score when playing this game may be based on "Standard Scoring" as further described below.

In Story mode, users may create certain profiles, in which their characters learn certain songs and play certain mini-games. The user may be encouraged then to practice with certain characters, and thus creates profiles in which his accomplishments or game-performance statistics are saved. Story mode may employ a framing narrative that takes a beginning user from never having picked up a guitar before through mastering rhythm guitar and basic music theory. The narrative story may frame a progression of mini-games in which the user is taken through increasingly advanced modes and increasingly difficult songs through many levels of play. Story mode may take advantage of any mini-game (or sub-mode) or view in a structured, leveled environment. The songs in Story mode may alternate between custom content for certain levels and specially tagged songs in a user's pre-loaded library. Thus, as a user moves through a narrative, the user may select and master music that the user cares about. At the end of the leveled system and narrative, the user's skill at rhythm guitar and the user's fundamental understanding of music theory may improve as a byproduct of compelling play, as the user acquires skills as the user plays the game.

Figure 14:
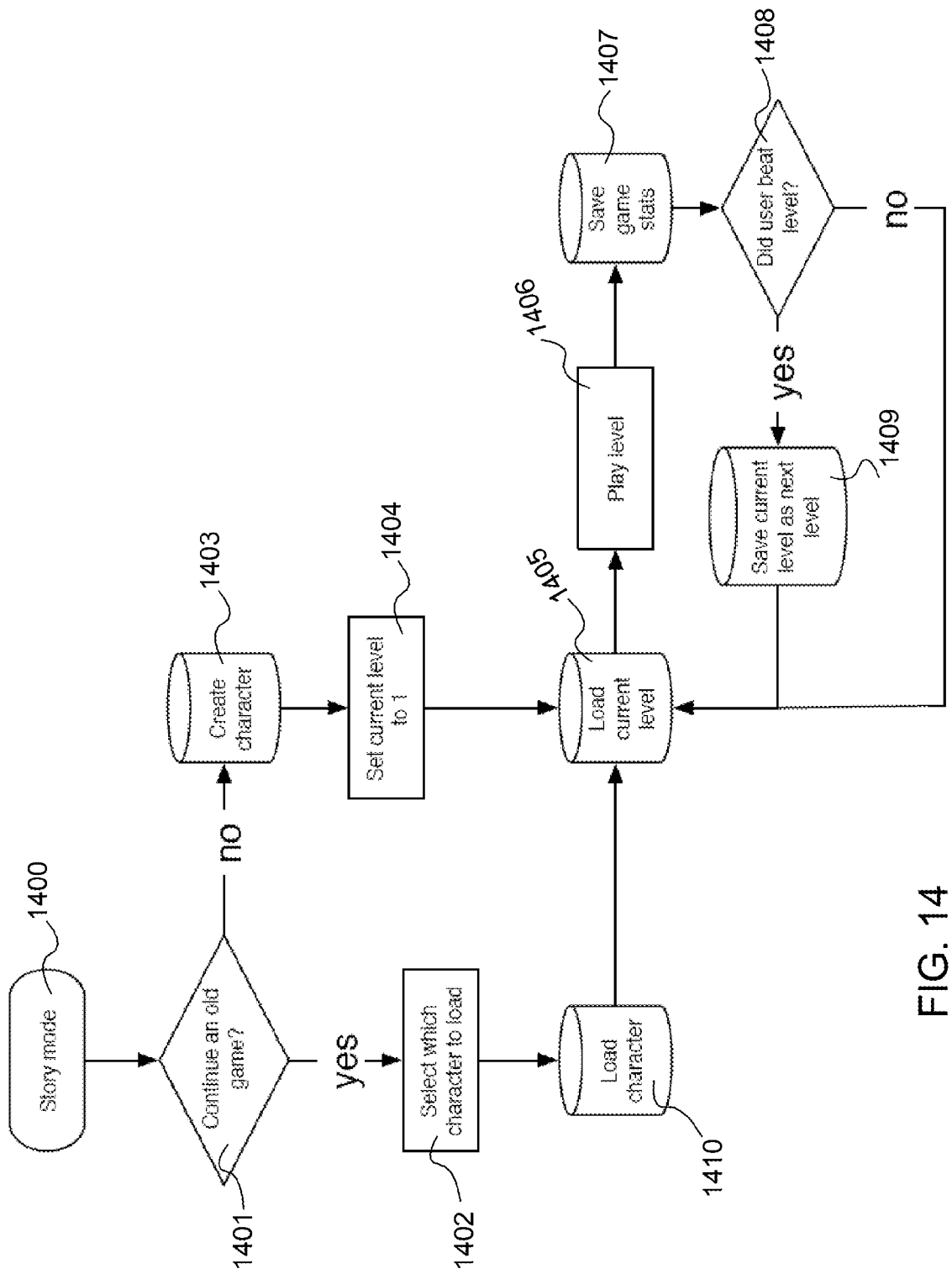
FIG. 14 illustrates a flowchart of what happens during Story mode of the game, in accordance with an embodiment of the invention.

In FIG. 14, a flowchart of the game when Story mode is selected is shown. In Story mode, the user may either create a new character in step 1403 or continue an old game in step 1401. If the user elects to continue an old game in step 1401, then the user may select a character to load in step 1402, the character may load in step 1410, the current level of play may load in step 1405, the user may play at that current level in

1406, and the game statistics may be saved in 1407. If the user beats the level or accomplishes whatever requirements the level has in step 1408, then the user may advance to the next level. If the user does not beat the level or meet the requirements in step 1408, then the user may need to repeat the same level in 1409. If the user elects to create a new character in 1403, then the user will follow the same steps, except the user will start at Level 1 in 1404.

As an example, a user may, in the first chapter (or Level 1) of the Story, learn core skills of a guitar player. For example, the first thing that a beginning user may do is to make sure they are in tune. A user, in Level 1, may learn how to tune their instrument and how to recognize when the instrument is out of tune. As further described below, an on-screen tuning system may allow the user to play one string at a time until the guitar is in tune. Users may revisit this tuning view later at anytime, and the software may also detect when the guitar is out of tune to ask the user to re-tune the guitar.

The tuning guide may aid the user in tuning their guitar, and may consist of a display of a diagram of each string, highlighting the current string being played. A note name may indicate what tone the system is receiving from the guitar, and a graph may highlight whether that note is flat or sharp from the ideal note. When the string is in tune, the string may be highlighted. Strings that are not currently in tune may be darkened or otherwise displayed to indicate their status. At the end of the process, the user may be asked to strum the guitar to make sure that all of the strings are in tune.

The tuning system may also be displayed as a Quick Tuner appearing in one small corner of the screen (e.g., the bottom right of the screen). After analyzing a note, the Quick Tuner may display to the user what note was played and whether the note was flat or sharp. A colored portion inside of the box may be yellow, for example, and lean flat for flat notes, turn the light below yellow and highlight the word "Flat" within the box. When the note is sharp, the color box may change colors to red, for example, and lean to the right, turn the light right, and highlight "Sharp" within the box. When in tune, the box may disappear and the light may turn to green, for example. The flat and sharp notes may be indicated in any number of ways.

Level 1 of Story mode may also introduce users to the guitar neck fret view. Users may become familiar with relating the fret numbers to different places on the guitar neck. A display may show certain highlighted notes, and then the user may play those highlighted notes at the user's own pace. Other guitar skills may be presented through mini-games or sub-modes, and in different views, where the user can be challenged to improve their ability and beat their friend's and their own, high scores. The Story may be broken up into days or different levels. For example, Story mode may span 90 days, which take the user through many different skills involved in playing a guitar.

Figure 15A:
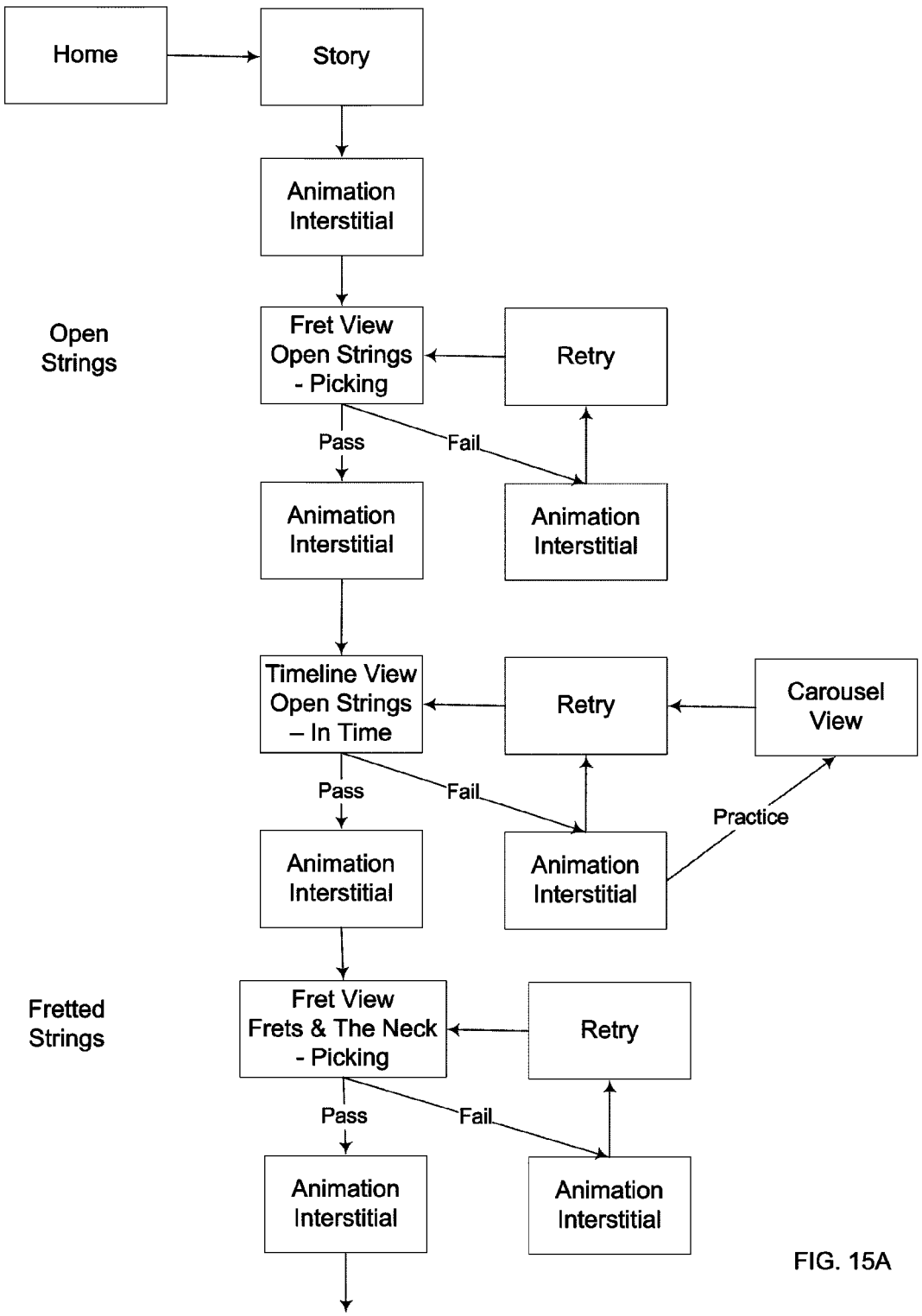
FIGS. 15A and 15B illustrate and example of a flowchart of what may happen during Story mode of the game, in accordance with an embodiment of the invention.
Figure 15B:
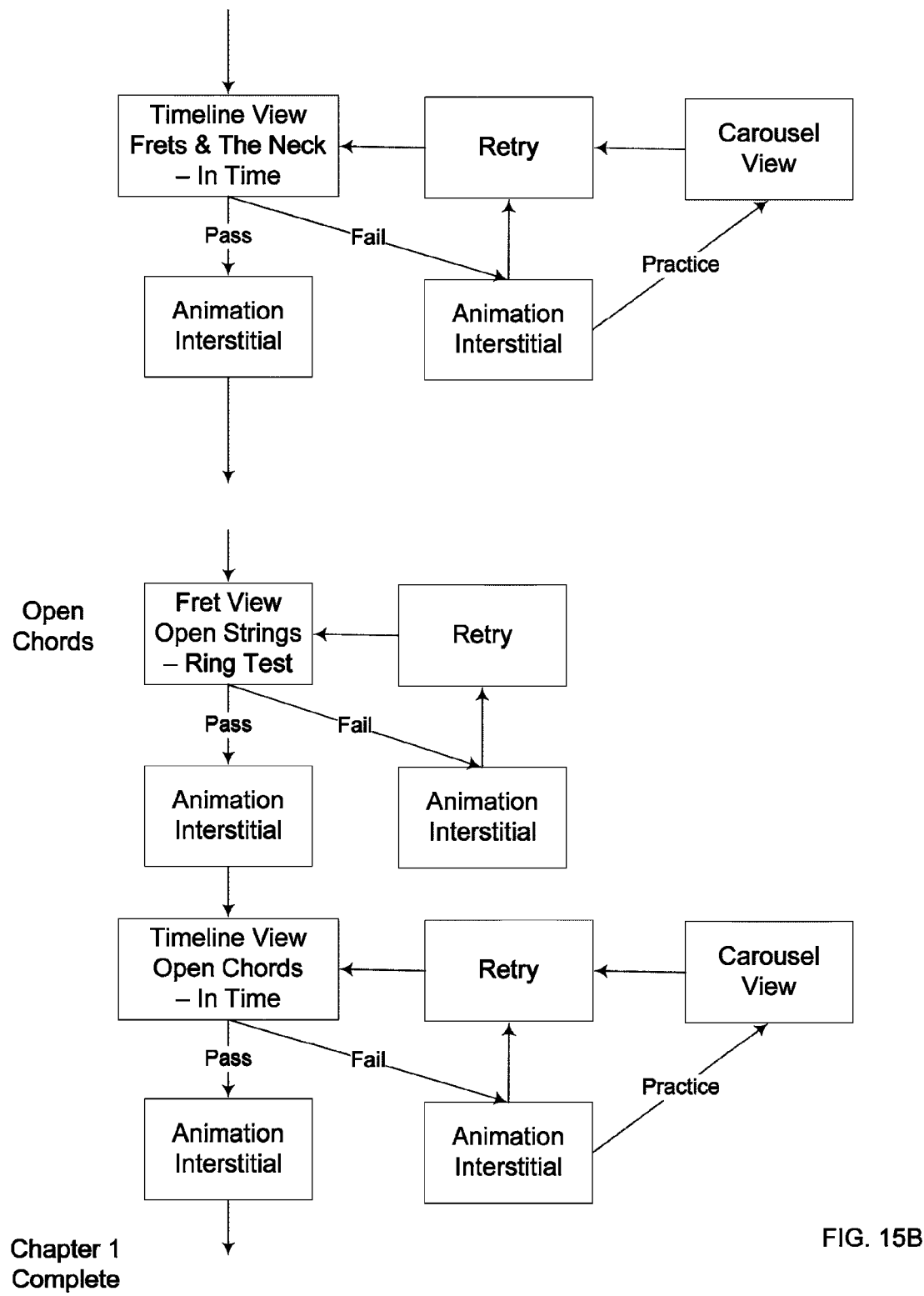

FIGS. 15A and 15B illustrate an example of a user's play through Story mode. Each box labeled "Animation Interstitial" represents the story frames that the game progresses through, which frame each exercise or game that is presented to the user. For example, a user may first be presented with a fret view of open strings to play a game that helps the user improve upon his or her picking skills, and then next presented with a timeline view of open strings to play a game that helps the user play in time, etc. As the user moves through the mini-games, the game engine presents a series of frames to transition from one mini-game to another.

An example of content of a Story, such as the frames to transition from one mini-game to another, may be as follows:

[shot: external, guitar shot on street]
[shot: dolly in through door opening (1$^{st}$ person)]
[shot: rocker guy in guitar shop addressing camera]
Hey, welcome to your first day. Here's the deal, we've got to put a bunch of guitars on the floor and we've got to make sure they're in working order.
{EXERCISE: guitar parts}
[shot: rocker guy in guitar shop addressing camera, girl walking around in the background]
Cool. Good Job. Look, you're going to get a lot of newbies in here asking you all sorts of questions, so you better make sure you know your stuff. We're going to get you playing guitar soon, but first thing we gotta do is make sure you're in tune.
{EXERCISE: tuning}
[shot: rocker guy in guitar shop addressing camera, girl walking around in background (seen through practice room window)]
OK, so you know your stuff. I'm going to put you in the trial room, just to set the tone in there. All you've got to do is play open strings.
{CHECK: tuning}
{EXERCISE: open string song}
[shot: rocker guy in guitar shop addressing camera, girl walking around in the background (seen through practice room window)]
Cool. Let's check out your skills.
{CHECK: tuning}
{EXERCISE: open string SIGHT SINGING}
[shot: rocker guy in guitar shop addressing camera, girl walks over behind rocker]
ROCKER: Awesome
GIRL: Gosh that took me forever, you mastered that really quickly. [girl walks away]

Thus, the user may bond with the characters within the Story, as the user spends more time interacting with the system and playing the exercises or mini-games. Each level then, is somewhat like an "Act" in a play or story. For example, the following could be some acts in Story mode:

Act 1
SKILLS: beginning knowledge, basic fret/guitar chords
STORY: meet guitar store guy, meet love interest. End of act 1, meet band guy who invites user to come by and play rhythm for his band.

Act 2
SKILLS: more chords, more frets
STORY: band practice space, playing songs, learning chords, timing, listening to other instruments, rock trivia/influences. Show announced.

Act 3
SKILLS: more chords, more frets
STORY: band plays small clubs, playing songs, band dynamics (band reacts poorly if user plays poorly), rock trivia/influences. Big show announced. Play big show. Love interest reacts favorably. Band mate comes backstage and says, "Cheers! We just igot signed! We're going on tour!"

Figure 16:
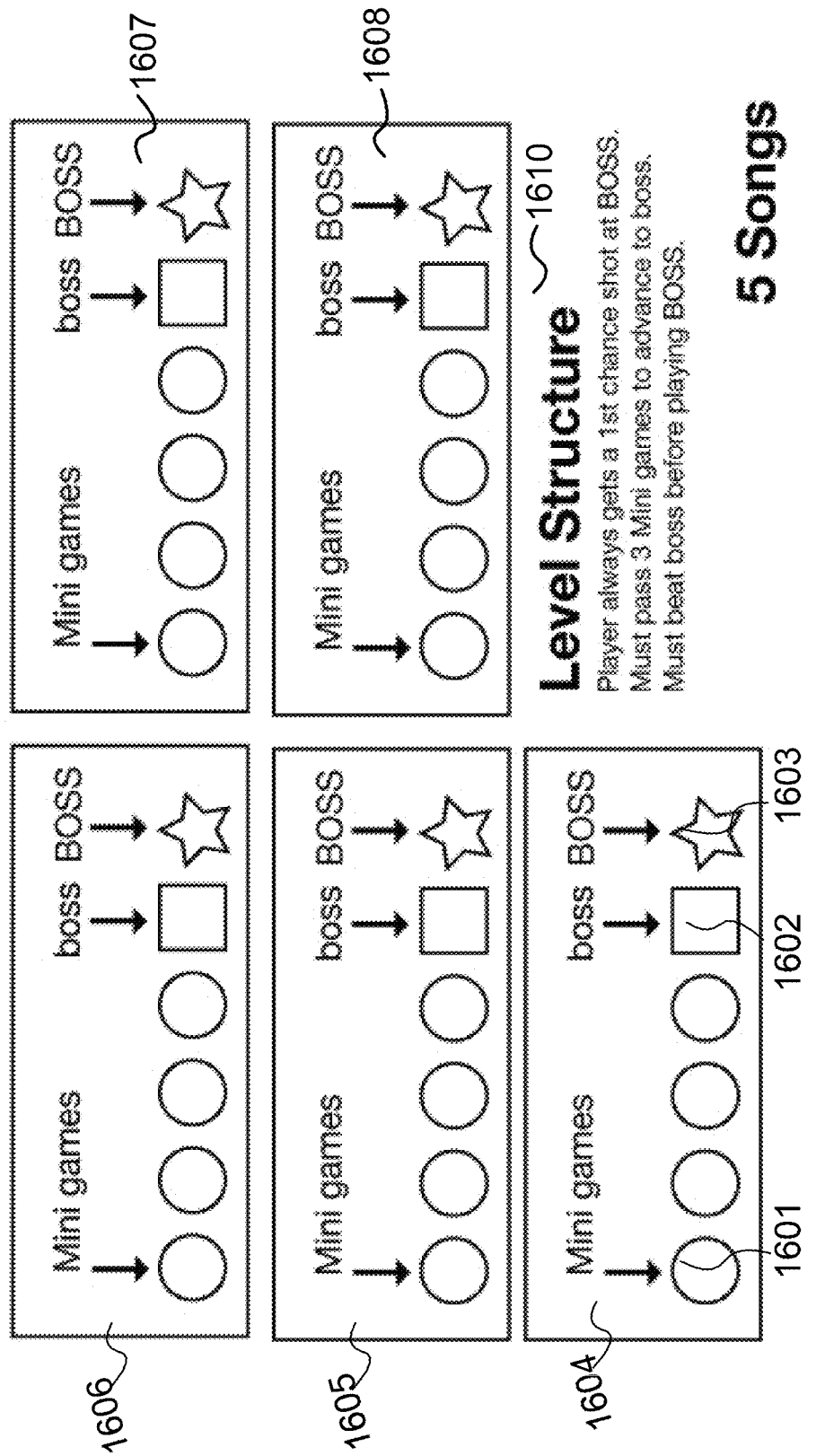
FIG. 16 illustrates an example of the level structure of each level of the game, in accordance with an embodiment of the invention.

Referring to FIG. 16, each level 1610 may have various sub-levels which include exercises for various songs 1604, 1605, 1606, 1607, and 1608 of a certain level. For example, if level 1610 is a beginning level, then 1604, 1605, 1606, 1607, and 1608 may include exercises for five different songs for beginners. Alternatively, the level 1610 may have various segments or sub-levels 1604, 1605, 1606, 1607, and 1608, which represent sections of the same song. Thus, alternatively, the level may have various sub-levels which have broken up one song into various parts, and have various exercises focused on these segmented parts of the song. These sub-levels 1604, 1605, 1606, 1607, and 1608 may make up one level 1610. Each sub-level 1604, 1605, 1606, 1607, and 1608 may have a series of exercises or mini-games 1601, 1602 and 1603. There may be several types of exercises, lessons or mini-games as later described. Each sub-level may also have a mini-boss level 1602 in which a user is required to play a song fully through or an entire segment of a song fully through, or even a sub-level boss 1603 in which certain accuracy or performance requirements must be met by the user. The boss or super-boss sub-levels may reflect a more difficult challenge, for example, the most challenging part of a song, or may require the user to reach certain levels of accuracy.

The game engine may offer various different levels, each with its own sub-levels and mini-games, which can be selected by the user. It should be noted that the different levels may be incorporated in any of the modes: Jukebox (Song Play) mode, Story mode, Multiplayer (Online) mode, or Arcade (Diagnostic) mode.

Figure 17:
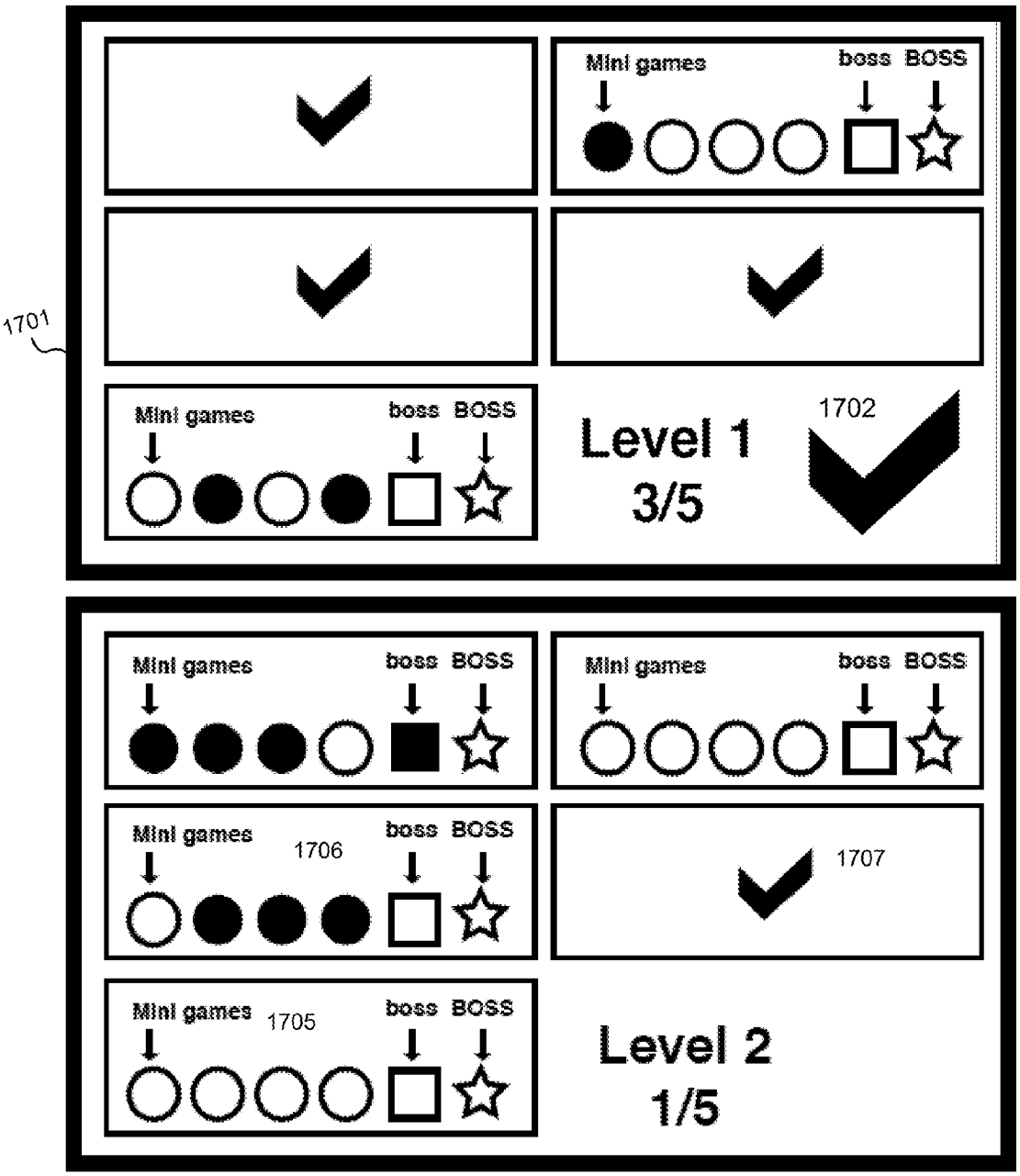
FIG. 17 illustrates one example of completion indicators as used to indicate completion of levels, sub-levels and mini-games, in accordance with an embodiment of the invention.

Referring to FIG. 17, as the user advances or completes certain mini-games, the menu may indicate completion of the level group 1701, as shown in FIG. 17. For example, the user may have completed Level 1, so instead of showing the various games and sub-levels available as part of the menu, the menu may simply display a completion indicator, such as a check-mark 1702, to show that the user has completed the level group Level 1 (1701). If the user has not yet completed a level group, such as Level 2 shown in FIG. 17, then the menu may display the various sub-levels and mini-games that the user may play. For example, in FIG. 17, the menu displays the yet to be played sub-level 1705, the partially completed sub-level 1706, and the completed sub-level 1707. If the user has completed a certain sub-level, for example, that particular sub-level may be displayed as completed with a completion indicator, such as a check-mark 1707. For the various mini-games, sub-level mini-boss, and sub-level boss, if the user has not completed such mini-games, the lack of completion may be shown by an open-circle, square or star, for example. As the user completes the various mini-games within each sub-level, the completion may be indicated by a filled-in circle, square or star, for example. In any case, the game engine may track which levels, sub-levels, and mini-games have been completed by the user. Further, the game engine may respond to the user's performance, and offer certain mini-games which cater to a user's particular weaknesses with regard to certain note or chord sequences, timing, etc. For example, if a user continues to mess up or make errors and mistakes on a particular chord sequence or in a particular section of a song, the game engine may create mini-games to address that, and the user may be allowed to practice those weaknesses through those particular mini-games. Thus, there may be visual indicators provided to the user to show how much of a song the user has learned.

Figure 18:
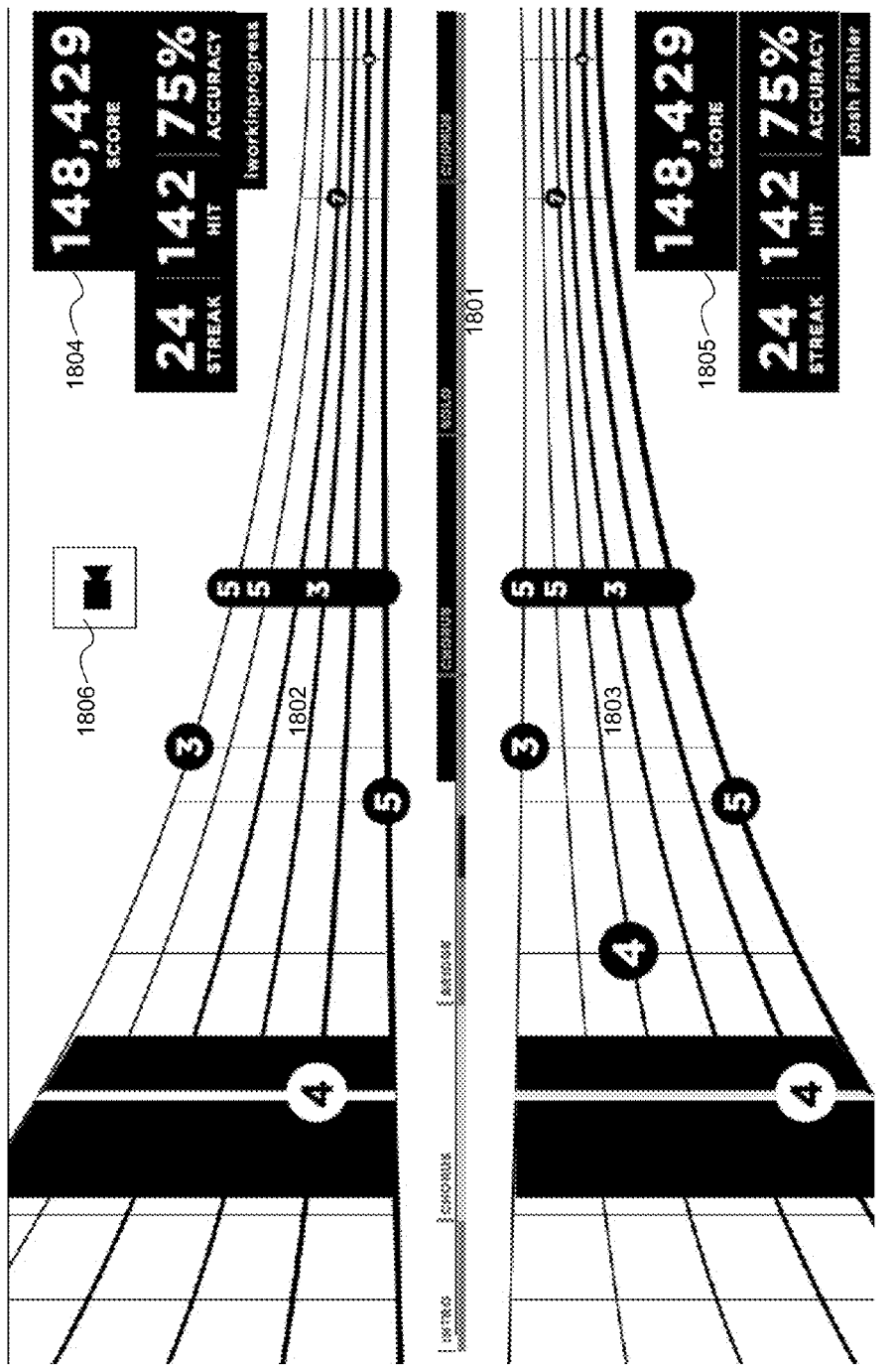
FIG. 18 illustrates an example of a view for two players playing simultaneously on the same machine, in accordance with an embodiment of the invention.

By choosing the Multiplayer (or Online) mode from the game selection menu, the user may participate in playing the mini-games or other games against other users or players. Thus, guitar playing becomes a social activity. Multi-player modes may enable users to play with their friends at their own speed, thus encouraging users to play together even if they have varied levels of skill. One option is for users to play in a Live Multiplayer sub-mode. For example, as shown in FIG. 18, two players may play simultaneously on the same machine. The view may be split by a progress bar 1801, thus showing two scrolling notations (1802 and 1803), one for each user. If a user is competing against other players while the user plays a particular song or game, the user's status may be shown on the screen (1804, 1805). The user's status (1804, 1805) may include the user's score, number of notes that they have hit, the user's accuracy rating, etc. Each user may have his own score box to track his progress. The users can play the same track, or different tracks if they are available for the current song. A music video, or any other video or image selected by the user 1806 may be displayed.

Another option is for users to play in a Mail Multiplayer sub-mode. In this sub-mode, after an individual user finishes a song play through, the individual user can choose to send a mail challenge to a friend or to another user. The other user will be notified of a pending challenge, and the next time they login will be able to attempt to beat their friend's score. In one embodiment, if the user does not already currently own the song, they may be able to play the song once for free. The user may also be prompted to purchase the song before responding to the challenge, for example, if they have already sampled the song once for free previously. While attempting to beat their friend's score, a progress bar may indicate how well they are doing versus their friend. Users may be able to play as many times as they want to try to beat their friend's score. If they do succeed in achieving a higher score, then the challenge may be returned to the initial user, and the initial user may try to beat the new high score.

Figure 19:
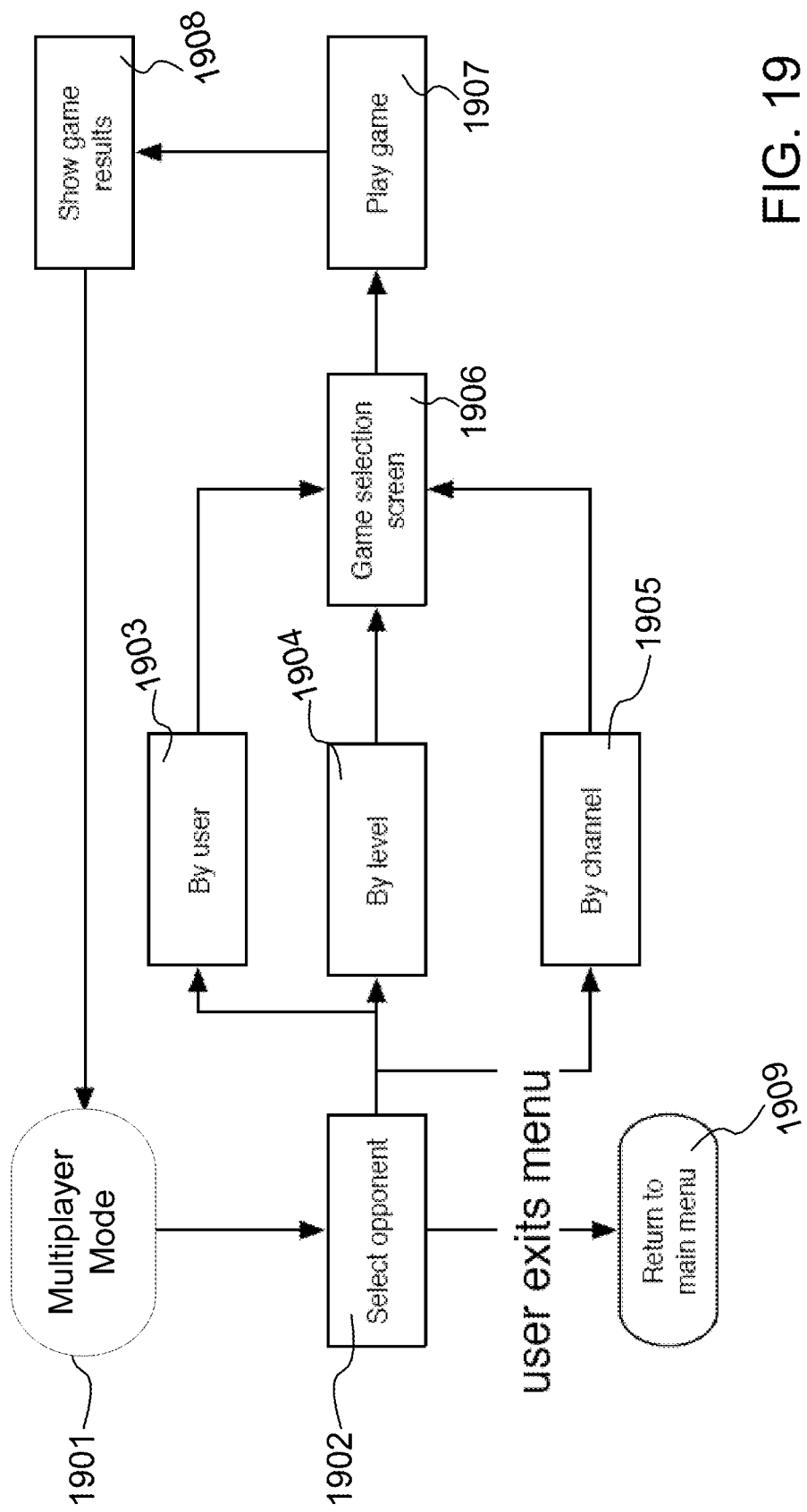
FIG. 19 shows a flowchart of the game when Multiplayer (or Online) mode is selected, in accordance with an embodiment of the invention.

FIG. 19 shows a flowchart of the game when Multiplayer (or Online) mode is selected. In step 1901, the Multiplayer (or Online) mode is selected. The opponent may be selected in step 1902, by the user 1903, by the level 1904, or by the channel 1905. After the opponent is selected, then the particular game to be played must be selected in step 1906. As the game is played 1907, the interactive elements and results will be displayed 1908.

In Arcade (or Diagnostic) mode, a user may play whatever songs and exercises there are in the game engine or user's library of music. For example, a user may be able to play all of the songs and exercises packaged with the game, unlockable content, and downloadable content. The user may practice full length songs or partial portions of songs in Arcade (or Diagnostic) mode. Arcade (or Diagnostic) mode is a collection of all of the games that comprise the overall system, and may allow users to play particular games that they like for any reason. This allows the user to focus on experience points, which are assigned based on the time the user spends playing each mode.

Mini Games:

Many different types of "mini-games" may be played using the game engine, some of which have been previously described. As another example, a user may play a mini-game, "Notes in a row," in which a user tries to play as many scrolling notes as they can until they make a mistake. If a user can play a certain number of "notes in a row" they will pass or win the mini-game. If they do not, then they may have to play again. "Notes in a row" may increase in difficulty in the various levels by increasing the tempo of the scrolling notes, increasing the note complexity, or increasing the number of notes that must be played without making a mistake. "Notes in a row" may decrease in difficulty in the various levels by allowing multiple attempts, allowing users to earn more attempts, decreasing the tempo, or freezing certain notes.

Another mini-game that may be played is "Ear training" in which a user is given a tone audibly, and asked to play the same tone. For example, a user can be given a certain number of tones that they must play correctly in order to pass or win the mini-game. "Ear training" may increase in difficulty in the various levels by increasing the note complexity or increasing the number of tones that must be played correctly in order to pass or win the mini-game. "Ear training" may decrease in difficulty in the various levels by allowing multiple attempts, allowing users to earn more attempts, or providing a range of possible choices. For example, after hearing the tone, the user may be shown that the tone is played on the $3^{rd}$ string, and somewhere between the $4^{th}$ and $8^{th}$ fret.

"Simon Says" is an additional mini-game that may be played, in which a user is briefly shown and played notes, and then is asked to play the same notes. For example, a user may be shown and played a certain number of notes, and then asked to play those same notes back. "Simon Says" may increase in difficulty throughout the levels by increasing the note complexity, increasing the number of notes that must be played back, increasing the speed of the scrolling notes that are shown to the user, or decreasing the time limit during which they must play back the notes. "Simon Says" may decrease in difficulty throughout the levels by allowing multiple attempts, allowing users to earn more attempts, providing the notes' strings but not the frets as the user plays the notes back, or freezing certain notes.

Another mini-game that may be played is the "Looping notes" game in which a scrolling group of notes plays in a loop, and the user must play all of the notes before the time runs out. As the user makes mistakes, more notes may appear. The goal of the game may be to play all of the notes displayed in a certain time frame, for example, 45 seconds. "Looping notes" may increase in difficulty throughout the levels by increasing the note complexity, increasing the number of notes that must be played, increasing the speed at which the notes scroll across the screen, decreasing the time limit in which the notes must be played, or increasing the number of times that the notes must be played. "Looping notes" may decrease in difficulty throughout the levels by allowing multiple attempts, allowing users to earn more attempts, allowing users to earn more time in which to play all of the notes, freezing the notes, or allowing note pops which remove more than one note at a time from the screen.

One more mini-game that may be played is a game where the "Song waits until you play it right". In this game, the full song may play until the hit line and wait for the user to play the queued note(s) correctly. Once the correct note(s) are played, the song commences again. If played well, the song would not skip a beat, but if not, the song will wait at the hit line, until the user can play the correct note(s). For example, the goal of the game may be to play a 3 minute tune in under 5 minutes and to play a 5 note streak. "Song waits until you play it right" may increase in difficulty by setting a shorter time limit, limiting the number of mistakes allowed, or requiring the user to play a certain number of notes in a row in addition. "Song waits until you play it right" may decrease in difficulty over the levels by allowing users to earn more attempts, allowing users to earn more time, or keep playing the song even if the user messes up. For example, if the user plays the correct notes in time for 10 notes in a row, the mini-game may allow a free mess up without stoppage.

Another mini-game that may be played may be "Rhythm action" in which a user must strum or play certain notes in sync with the rhythm that goes along with the song being played. The goal may be to play in rhythm a certain percentage of the time, e.g., 75%. "Rhythm action" may increase in difficulty by limiting the number of mistakes allowed, increasing the note complexity, or increasing the tempo of the rhythm. "Rhythm action" may decrease in complexity by allowing users to earn more attempts, allowing users to earn more time, or giving users credit or increases in score for playing a certain number of notes in rhythm in a row.

Another mini-game that may be played is "Speed Trials" in which the goal of the user would be to play a shown sequence as fast as possible or in time. This game may help train the user in improving their play of scales, speed exercises, chords or ear training Speed Trials may be played with a guitar neck view in which the notes of the entire sequence would always be showing. The current note could be highlighted in a certain color (e.g., in white) and could enlarge. When the user hits the current note, the next note in the sequence may be highlighted. If the user hits an incorrect note, the note may turn a different color (e.g., red). If the user hits the correct note, the note may turn a certain color (e.g., green). This may continue for a set amount of time (e.g., one or two minutes). Speed Trials may also be played in a timeline view, in which case the current note may be situated on a hit line (or in a hit area), and as soon as the user hits the note, the system may register it as a hit or miss, and animate the note off of the screen. The timeline then may slide the notes so that the next note of the sequence is on the hit line (or within a hit area). Other variations of this mini-game could include having users play the notes on a beat, or having the users play the notes as fast as possible.

Another mini-game that may be played is "Find the Note" in which the goal of the user is to play the correct note name shown. This mini-game may train a user in note recognition and ear training In Find the Note, a note name may be shown with several fret options highlighted, and only one of the options may be correct. If the user hits the wrong note, the display may turn a certain color (e.g., red) and the user's score may be subtracted. If the user hits the correct note, the display may turn a different color (e.g., green) and the user's score may be increased. Difficulty settings of this mini-game may increase or decrease (i.e. get harder or become easier) depending on the amount of false notes showing.

Another mini-game that may be played is "Find All Notes" in which the goal of the user may be to play all of the highlighted notes on all possible frets. In this game, a user may improve their note recognition abilities. The mini-game may also help with ear training. In Find All Notes, a note name may be shown on the display along with a number of possible places to play that note. Each time the user plays the correct note on a fret, the note may be highlighted and the number of possible places may be subtracted by one. Difficulty settings of this mini-game may increase or decrease (i.e. get harder or become easier) depending on the amount of time given to find all of the possible notes.

In addition, because playing the guitar may be exhausting for new players, a range of non-guitar games may help with new players to combat fatigue. The non-guitar games may enable users to continue playing while improving their musical skill and music history. For example, users may play beat matching or note recognition games, or play musical history games involving naming certain tunes, musical trivia or instrument quizzes.

At the completion of each game, the user may be shown their score and other additional information (such as their friend's high scores, links to a store, in-area concert ads, suggested challenges, etc.).

After the user completes all of the mini-games in a sub-level, the user can complete the sub-level mini-boss or sub-level boss games. The boss games may require the user to play an entire song or play an entire song correctly. It should be noted that each mini-game may be presented in a number of view such as the Guitar Neck View, Timeline View, or Carousel View as appropriate.

Figure 20:
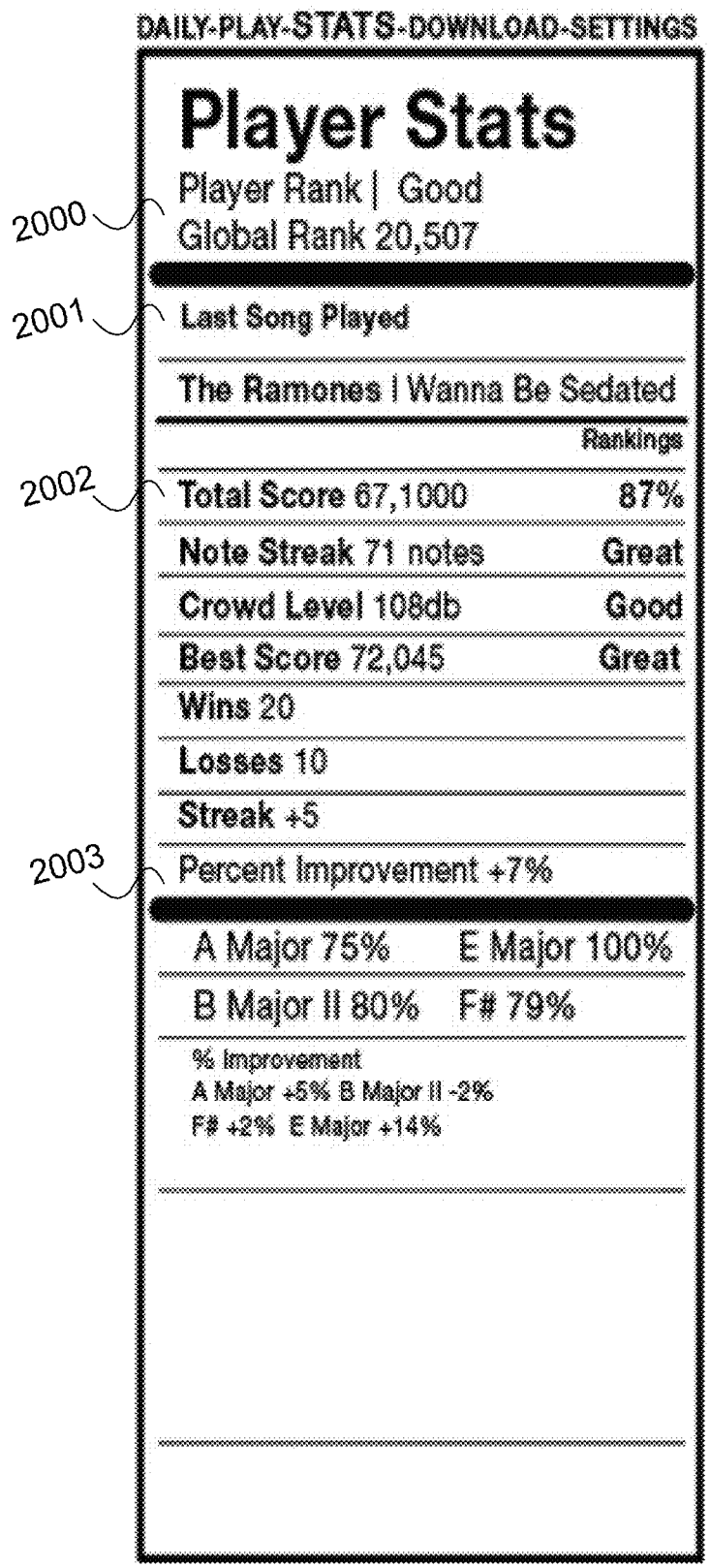
FIG. 20 shows an example of how a user's statistics may be displayed, in accordance with an embodiment of the invention.

As the user plays the various games, including the mini-games, mini-boss and boss in the sub-levels, the user's statistics can be stored and displayed. The user may keep track of their scores, their ranking against other users, their improvement, accuracy with regard to particular chords, or even a breakdown of improvement with regard to particular chords. One example of a user's statistics is shown in FIG. 20. For example, a user's overall player ranking may be tracked and stored 2000. In addition, a user's song history may be kept and stored, and may include information such as the last song that the user played 2001. A user's score on individual songs, or rankings on individual songs compared to other users may be calculated and presented to the user 2002. Other statistics could include information such as the user's best score, the number of wins, number of losses, the user's longest note streak or other statistics 2002. The user's percentage improvement may also be calculated, as well as broken down into the user's percentage improvement with respect to playing a particular chord or chords 2003. Many types of statistics may be tracked and stored and are contemplated herein.

Players may be able to earn points depending on their accuracy of play. For example, if there are 1,000 points possible, and a player has 50% accuracy in a playthrough, that user may earn 50 points for that playthrough. Once 1,000 points are earned from a song, then no more points may be earned from that song, perhaps except by mastering it through some other challenge. The system may vary the number of points earned, depending on whether the song is above or below the user's play level as well.

The system may also vary the number of points on a scale. For example, scores over 90% may automatically earn the full points of a song, and an additional bonus point amount. This may allow expert users to move up quickly without having to repeat easy songs indefinitely. Additionally, each song mastered may add a modifier to a user's global point modifier. The amount added may be equal to 0.01*song or skill level, for example. Thus, if a user masters a level 2 song, a user may have 0.02 added to their point modifier. Thus, mastering more songs allows user to move up levels faster.

Players may also earn points through the amount of time that they have spent playing. This may reward users who may not be progressing as quickly, but are still putting in many hours trying to improve. Thus, for each hour that a user plays, a certain number of points may be earned. Also, perhaps for each consecutive day played, a certain number of bonus points (a Time Bonus) could be added, thus encouraging users to play daily. There may be a limit on the number of points that may be earned each day from the amount of time playing. For example, the Points=(Time Playing*100)*(1+Time Bonus*0.25)).

Many games may be scored in different ways. For example, a Standard Scoring mechanic may provide a certain number of points for each successfully hit note or chord (e.g., 75 points for each successfully hit note, and 125 points for each successfully hit chord).

Many variables could be factored into a score equation. For example, one scoring equation could be: Score+= ((POINTS*SB)+=(DM*4))*(1+(SM*0.1))*PB.

Duration Modifier (DM): Many notes may have a sustain duration associated with them. Releasing early or late may add to the Duration Modifier (DM). The Duration Modifier may be equal to the number of seconds away from the ideal sustain. This would not apply to notes without sustain.

Sustain Bonus (SB): If the user's sustain was within 0.25 seconds away from the idea (or some other appropriate threshold), then the user may receive a Sustain Bonus that could increment (e.g., double) the amount of points earned. This would not apply to notes without sustain.

Streak Modifier (SM): Additionally, each consecutive successful note may add to the Streak Modifier. This may reward players for constancy and encourage mastery of songs in order to achieve a top score. For example, hitting ten (or some other number) of consecutive notes may increase (e.g., double) the points earned, hitting twenty consecutive notes may triple the points earned, and so on. There may not be a cap for the Streak Modifier.

Pedal Bonus (PB): If the user successfully hits specially marked notes, a Pedal Bonus may be unlocked. When the user next stomps on the A Button of the Foot Pedal, their score may be doubled (or otherwise increased) for a certain duration of time (e.g., the next 15 seconds).

Other games may implement a time scoring calculation. For example, in Jukebox Wait sub-mode, the timeline may stop when the user does not hit the correct note, and may only restart when the user plays the correct note. Thus, a timer may indicate the difference between the ideal time and the player's actual time. For these types of games, a time may be factored into the scoring equation. For example then, a Time Modifier (TM) may be factored into the scoring equation. In one embodiment, for each second away from the ideal time, a point may be added to the Time Modifier. The Score would then be equal to the Standard Scoring Equation*(1−(TM*0.01)), for example.

One skilled in the art can appreciate that various types of statistics, scores and rankings may be stored, tracked and calculated, and are not limited to the particular embodiments described herein.

The system may also incorporate a leveling system which divides groups of users into distinct levels based on their guitar experience and ability. This would allow the system to recommend mini-games and songs to users that will be challenging but not frustrating and allow users to find people of similar ability to challenge and collaborate. The levels may be increased by earning experience points. Each song may be assessed and assigned a difficulty, which would allow the system to suggest appropriate songs to users and encourage exploration of new music with a user's skill level.

A user's statistics may be recorded and stored, allowing the system to identify what a user is struggling with and allowing the system to suggest new music or mini-games that could help the user overcome those struggles. The suggestions could be scaled to the user's proficiency, ensuring compelling gameplay and continued demonstrable incremental improvements. It would also give the user a sense of satisfaction of being able to look over these statistics and see their improvement over time. This may encourage the user to continue playing as well as focus on errors where their statistics show room for improvement. For example, statistics that may be tracked include the user's worse/best note transition, worst/best chord transition, worst/best song segment, time winning/losing, notes hit/missed, songs played/learned/mastered/domination, world/country/regional ranking, songs purchased, highest/lowest score, longest streak, time streaking, etc.

Figure 21:
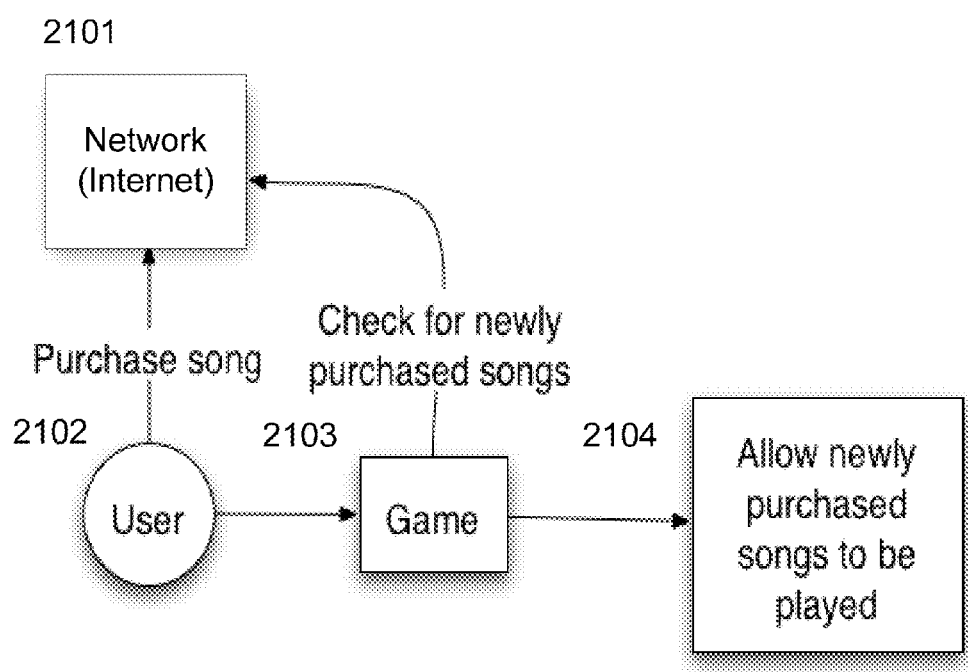
FIG. 21 shows an example of how the game engine may interact over a network such as the Internet, in accordance with an embodiment of the invention.

Further, when users complete special tasks, they may be given an achievement as evidence of their accomplishment. Achievements may encourage users to explore new areas of the game as well as perform at the highest level possible. Users may be able to show off these achievements and compare them with their friends. For example, a user may achieve X number of note streaks, X number of songs with a certain hit accuracy, won X number of matches against other users, completed X number of songs by the same artist, completed an artist's album, completed X number of songs, purchased X number of songs, etc. Other achievements may include finishing a song without touching a string, finishing two songs in a row from vastly different genres, beating the same person X number of times in a row, beating X number of songs on a certain subject or from a certain genre (e.g., sex, drugs, broken hearts, love, pre-1950, girl songs, boy songs, pop song, songs from a certain artist, campfire songs, etc.), or playing X number of songs at a certain hour, playing the game at X different locations, etc. One example of a user's statistics is shown in FIG. 21.

The software or game engine may also employ an online component. In FIG. 22, the game engine may interact with a web page, in which a user 2202 may purchase a song from a web page or web site 2201 through the game 2203. The game 2203 may then take the newly purchased song online, such as from a web page 2201, and allow the newly purchased songs to be played 2204 through the game 2204.

Further, as users play through songs, the system may leverage the data available on the Internet to provide value-added information for the users. This may allow users to easily find out more information about the music that they are playing. In addition, statistics tracking, skill progression, daily progress, play histories, and other features may be available online. A user may be able to follow along with their friend's achievements, and challenge and encourage each other. Talented players may amass fans and give others pointers on how to play certain songs. Teachers and parents may follow along with daily progress and receive weekly breakdowns through email, for example. Users may be able to be provided feedback about how they compare to other people in their local communities. For example, when a user starts playing, they may be the "best player within 10 feet" and after playing for a few weeks, they may advance to the "best player within 100 miles."

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. An interactive guitar system for learning to play a song on a guitar comprising:
    a guitar input device for receiving an analog or digital audio signal when the guitar is played by a user;
    a processor executing a game engine configured to allow the user to play the song, assess a performance of the song by the user, determine a portion of the performance that should be improved, and, based on the assessed performance and the determined portion of the performance that should be improved, automatically generate at least one mini-game targeted to improving the user's skills associated with performance of the determined portion,
    wherein the at least one mini-game is different from the song on which the user's performance was assessed; and
    an audio-video display device for displaying notation to be played by a user for the song at a given time for the song and providing feedback on performance by the user.

2. An interactive guitar playing system as in claim 1, wherein the processor executing the game engine is configured to assess past performances of the user and recommend appropriate songs based on a skill level of the user as determined from the past performances.

3. An interactive guitar playing system as in claim 1, wherein the audio-video display device displays a played notation for the guitar input device of the song or portion thereof actually played by the user.

4. An interactive guitar playing system as in claim 1, wherein the guitar generates either a composite audio signal or a discrete audio signal for processing.

5. An interactive guitar playing system as in claim 1, wherein the notation is presented in a timeline view, the timeline view having notation scrolling from right to left and a video in the background, wherein an audio output of the song is timed to the scrolling notation, and wherein the scrolling notation includes notes or chords that reach a hit area indicating to the user to play the notes or chords within the hit area.

6. An interactive guitar playing system as in claim 1,
    wherein the notation is a rotating notation and includes a plurality of symbols corresponding to notes or chords to be sequentially played in a repeatable manner,
    wherein the note or chord symbols corresponding to notes or chords to be played next in the song are displayed in a front portion of the rotating notation, and wherein note or chord symbols corresponding to subsequent notes or chords of the song are displayed in a back portion of the rotating notation, and
    wherein the note or chord symbols in the back portion of the rotating notation are partially viewable through the front portion of the rotating notation.

7. An interactive guitar playing system as in claim 1,
    wherein the notation includes a plurality of symbols displaying note or chord names,
    wherein the notation includes indications of timing of notes or chords to be sequentially played, and
    wherein the notation includes a hit zone for indicating when the notes or chords are to be played.

8. An interactive guitar playing system as in claim 1, wherein the notation is displayed in a guitar neck view, the guitar neck view having a grid on top of a representation of a guitar fretboard and a display of note or chord names.

9. An interactive guitar playing system as in claim 1,
    wherein the feedback on performance indicates whether the user has played an incorrect note or chord, and
    wherein points are awarded according to a user's timing of play.

10. An interactive guitar playing system as in claim 1, wherein the game engine, upon execution by the processor, is configured to include a framing narrative, the framing narrative framing a story as a progression of mini-games in which the user progresses through different levels of play.

11. An interactive guitar playing system as in claim 10, wherein the progression of a particular mini-game pauses until the user has played a correct note or chord.

12. An interactive guitar playing system as in claim 1, wherein the audio-video display device displays separate notation to be played by more than one user.

13. An interactive guitar playing system as in claim 1, wherein said audio-video display device additionally provides, responsive to user performance of the song, one or more of: a performance meter presented on the audio-video display device, an overall game score presented on the audio-video display device, an indication of a performance score boost, visual or text encouragement or discouragement, and a change in background video or animation.

14. An interactive guitar playing system as in claim 1, wherein the game engine, upon execution by the processor, is configured to provide a song interpreter that produces a game presentation of notes or chords to be displayed by a note or chord manager on the audio-video display device.

15. An interactive guitar playing system as in claim 1, wherein the game engine, upon execution by the processor, is configured to provide a strum indicator, which indicates a desired strum direction at a given time.

16. An interactive guitar playing system as in claim 1, wherein a displayed note, notes, chord, or chords to be played in the future during the song includes a different opacity than a note, notes, chord, or chords due to be currently played.

17. An interactive guitar playing system as in claim 1, wherein said song is provided from a library that includes at least one song purchased from an online store.

18. An interactive guitar playing system as in claim 1, wherein the system is configured to associate the user with a distinct skill level based on experience and ability and to allow the user to find people of similar ability to challenge and collaborate.

19. An interactive guitar system for learning to play a song on a guitar comprising:
a guitar input device for receiving an analog or digital audio signal when the guitar is played by a user;
a processor executing game engine configured to allow the user to play the song, break the song into a plurality of sections, assess a performance of at least one of the plurality of sections as played by the user, identify at least one of the plurality of sections that should be improved, and automatically generate at least one mini-game targeted to improving the user's performance of the identified section,
wherein the at least one mini-game is distinct and different from the identified section on which the user's performance was assessed; and
an audio-video display device for displaying notation to be played by a user for the song at a given time for the song and providing feedback on performance by the user.

20. An interactive guitar playing system as in claim 19, wherein the plurality of sections represent different levels of play, such that one of the plurality of sections allows the user to target a type of technique for which the user desires to improve.

21. An interactive guitar playing system as in claim 19, wherein the processor executing the game engine is configured to assess past performances of the user and recommend appropriate songs based on a skill level of the user as determined from the past performances.

22. An interactive guitar playing system as in claim 19, wherein the audio-video display device displays a played notation for the guitar input device of the song or portion thereof actually played by the user.

23. An interactive guitar playing system as in claim 19, wherein the guitar generates either a composite audio signal or a discrete audio signal for processing.

24. An interactive guitar playing system as in claim 19, wherein the notation is presented in a timeline view, the timeline view having notation scrolling from right to left and a video in the background, wherein an audio output of the song is timed to the scrolling notation, and wherein the scrolling notation includes notes or chords that reach a hit area indicating to the user to play the notes or chords within the hit area.

25. An interactive guitar playing system as in claim 19, wherein the notation is a rotating notation and includes a plurality of symbols corresponding to notes or chords to be sequentially played in a repeatable manner,
wherein the note or chord symbols corresponding to notes or chords to be played next in the song are displayed in a front portion of the rotating notation, and wherein note or chord symbols corresponding to subsequent notes or chords of the song are displayed in a back portion of the rotating notation, and
wherein the note or chord symbols in the back portion of the rotating notation are partially viewable through the front portion of the rotating notation.

26. An interactive guitar playing system as in claim 19, wherein the notation includes a plurality of symbols displaying note or chord names, wherein the notation includes indications of timing of notes or chords to be sequentially played, and
wherein the notation includes a hit zone for indicating when the notes or chords are to be played.

27. An interactive guitar playing system as in claim 19, wherein the notation is displayed in a guitar neck view, the guitar neck view having a grid on top of a representation of a guitar fretboard and a display of note or chord names.

28. An interactive guitar playing system as in claim 19, wherein the feedback on performance indicates whether the user has played an incorrect note or chord, and
wherein points are awarded according to a user's timing of play.

29. An interactive guitar playing system as in claim 19, wherein the game engine, upon execution by the processor, is configured to include a framing narrative, the framing narrative framing a story as a progression of mini-games in which the user progresses through different levels of play.

30. An interactive guitar playing system as in claim 29, wherein the progression of a particular mini-game pauses until the user has played a correct note or chord.

31. An interactive guitar playing system as in claim 19, wherein the audio-video display device displays separate notation to be played by more than one user.

32. An interactive guitar playing system as in claim 19, wherein said audio-video display device additionally provides, responsive to user performance of the song, one or more of: a performance meter presented on the audio-video display device, an overall game score presented on the audio-video display device, an indication of a performance score boost, visual or text encouragement or discouragement, and a change in background video or animation.

33. An interactive guitar playing system as in claim 19, wherein the game engine, upon execution by the processor, is configured to provide a song interpreter that produces a game presentation of notes or chords to be displayed by a note or chord manager on the audio-video display device.

34. An interactive guitar playing system as in claim 19, wherein the game engine, upon execution by the processor, is configured to provide a strum indicator, which indicates a desired strum direction at a given time.

35. An interactive guitar playing system as in claim 19, wherein a displayed note, notes, chord, or chords to be played in the future during the song includes a different opacity than a note, notes, chord, or chords due to be currently played.

36. An interactive guitar playing system as in claim 19, wherein said song is provided from a library that includes at least one song purchased from an online store.

37. An interactive guitar playing system as in claim 19, wherein the system is configured to associate the user with a distinct skill level based on experience and ability and to allow the user to find people of similar ability to challenge and collaborate.

* * * * *